(12) United States Patent
Rhodes et al.

(10) Patent No.: US 11,763,565 B2
(45) Date of Patent: Sep. 19, 2023

(54) FINE-GRAIN OBJECT SEGMENTATION IN VIDEO WITH DEEP FEATURES AND MULTI-LEVEL GRAPHICAL MODELS

(71) Applicant: Intel Corporation, Santa Clara, CA (US)

(72) Inventors: Anthony Rhodes, Santa Clara, CA (US); Manan Goel, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 802 days.

(21) Appl. No.: 16/678,428

(22) Filed: Nov. 8, 2019

(65) Prior Publication Data

US 2020/0074185 A1    Mar. 5, 2020

(51) Int. Cl.
| | |
|---|---|
| *G06K 9/00* | (2022.01) |
| *G06V 20/40* | (2022.01) |
| *G06T 7/168* | (2017.01) |
| *G06T 7/11* | (2017.01) |
| *G06T 11/20* | (2006.01) |

(Continued)

(52) U.S. Cl.
CPC ............. *G06V 20/49* (2022.01); *G06F 17/18* (2013.01); *G06N 3/047* (2023.01); *G06T 7/11* (2017.01); *G06T 7/168* (2017.01); *G06T 11/20* (2013.01); *G06V 20/46* (2022.01); *G06T 2207/20081* (2013.01); *G06T 2207/20084* (2013.01); *G06T 2210/12* (2013.01)

(58) Field of Classification Search
CPC .......... G06V 20/49; G06V 20/46; G06T 7/11; G06T 7/168; G06T 11/20; G06T 2207/20081; G06T 2207/20084; G06T 2210/12
See application file for complete search history.

(56) References Cited

U.S. PATENT DOCUMENTS

| | | | | |
|---|---|---|---|---|
| 8,290,253 B1 * | 10/2012 | Wang | ...................... | G06T 7/149 |
| | | | | 382/162 |
| 8,358,691 B1 * | 1/2013 | Wang | ........................ | G06T 7/20 |
| | | | | 382/199 |
| 10,755,142 B2 * | 8/2020 | Saliou | .................... | G06N 3/084 |

(Continued)

FOREIGN PATENT DOCUMENTS

| | | | | | |
|---|---|---|---|---|---|
| CN | 101676953 B | * | 8/2012 | ............. | G06T 7/12 |
| CN | 109479098 A | * | 3/2019 | ............. | G06T 11/60 |

(Continued)

OTHER PUBLICATIONS

Video Object Segmentation by Learning Location-Sensitive Embeddings, Hai Ci et al., ECCV, 2018, pp. 1-16 (Year: 2018).*

(Continued)

*Primary Examiner* — Jayesh A Patel
(74) *Attorney, Agent, or Firm* — Essential Patents Group, LLP

(57) ABSTRACT

Techniques related to automatically segmenting a video frame into fine grain object of interest and background regions using a ground truth segmentation of an object in a previous frame are discussed. Such techniques apply multiple levels of segmentation tracking and prediction based on color, shape, and motion of the segmentation to determine per-pixel object probabilities, and solve an energy summation model to generate a final segmentation for the video frame using the object probabilities.

22 Claims, 9 Drawing Sheets

(51) Int. Cl.
*G06F 17/18* (2006.01)
*G06N 3/047* (2023.01)

(56) References Cited

U.S. PATENT DOCUMENTS

| | | | | |
|---|---|---|---|---|
| 2008/0136820 | A1* | 6/2008 | Yang | G06F 3/04845 345/173 |
| 2010/0046830 | A1* | 2/2010 | Wang | G06T 7/12 382/164 |
| 2013/0121577 | A1* | 5/2013 | Wang | G06V 10/764 382/173 |
| 2016/0379371 | A1* | 12/2016 | Chen | G06T 7/12 382/173 |
| 2017/0358092 | A1* | 12/2017 | Bleibel | H04N 5/272 |
| 2019/0073564 | A1* | 3/2019 | Saliou | G06V 10/255 |

FOREIGN PATENT DOCUMENTS

| | | | | |
|---|---|---|---|---|
| GB | 2426137 A | * | 11/2006 | G06K 9/32 |
| WO | WO-2017215622 A1 | * | 12/2017 | G06K 9/3233 |

OTHER PUBLICATIONS

Fast object segmentation in unconstrained video, Anestis Papazoglou et al., ICCV, 2013, pp. 1777-1784 (Year: 2013).*

Recurrent neural network for facial landmark detection, Yu Chen et al., Elsevier, 2017, pp. 26-38 (Year: 2017).*

Bertinetto, L. et al., "Fully-Convolutional Siamese Networks for Object Tracking", European Conference on Computer Vision (ECCV), 2016.

Krizhevsky, A. et al., "ImageNet Classification with Deep Convolutional Neural Networks", In Advances in Neural Information Processing systems (NIPS); pp. 1-9; 2012.

* cited by examiner

FINE-GRAIN OBJECT SEGMENTATION IN VIDEO WITH DEEP FEATURES AND MULTI-LEVEL GRAPHICAL MODELS

BACKGROUND

Fine-grain object segmentation in video, which also may be characterized as semantic segmentation, is an important task in a large number of visual workflows including rotoscoping and inpainting in film and related industries. Such fine-grain object segmentation faces many challenges including video data naturally undergoing many types of transformations and deformations (e.g., non-linear motion, rotation, occlusion, luminance changes, perspective variation, etc.) that make accurate segmentation difficult. Furthermore, graphics artists require very high fidelity segmentation in each frame for use by professional video editing applications.

Current fine-grain object segmentation techniques are often performed by hand or partially by hand (e.g., manual clicking, manual spline correction, manual color seeding, etc.) and are exceptionally labor intensive requiring dozens or even hundreds of manual operations per frame. There is an ongoing interest in providing automated and improved dense fine-grain object segmentation. It is with respect to these and other considerations that the present improvements have been needed. Such improvements may become critical as the desire to perform fine-grain object segmentation in video becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
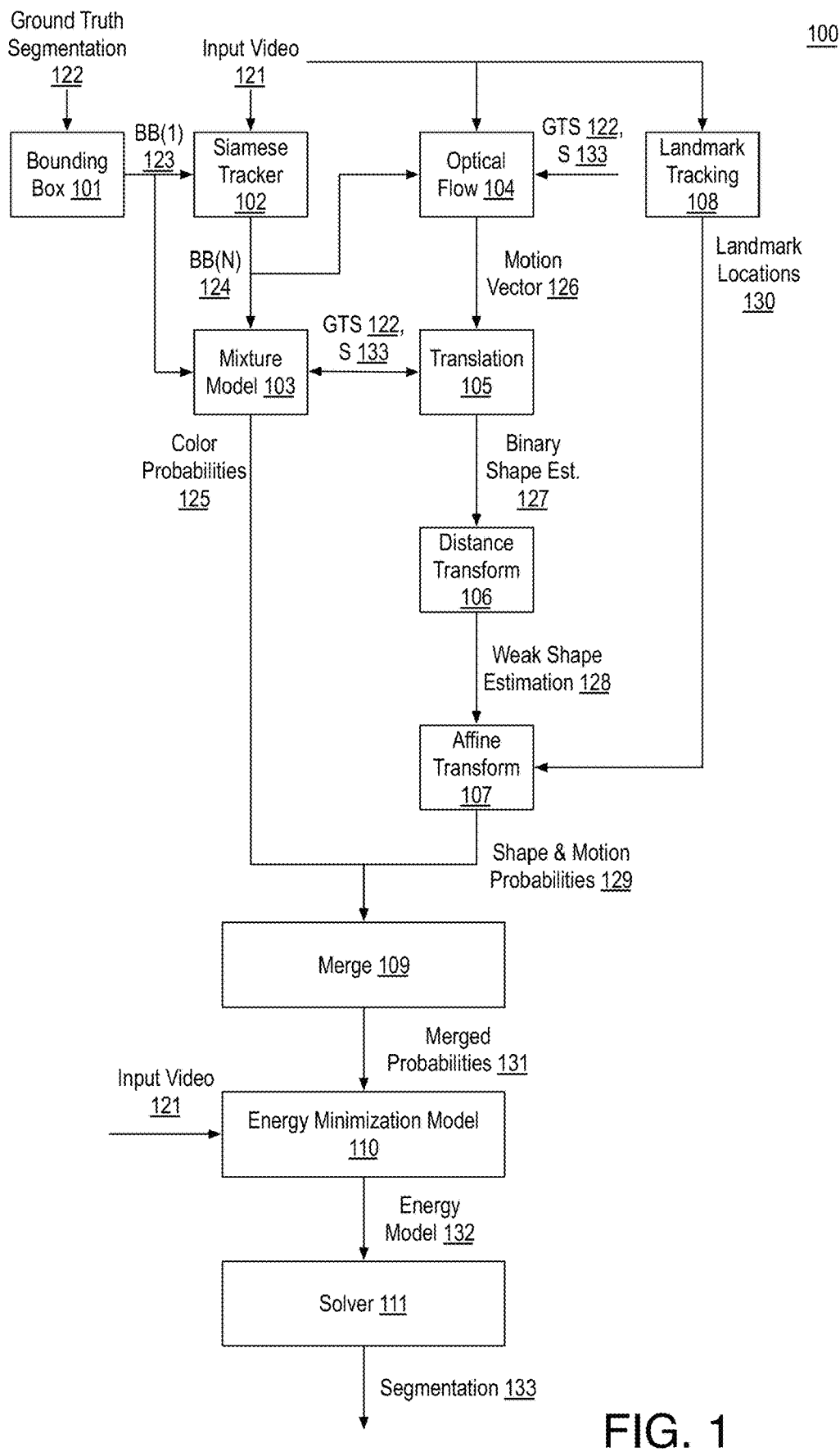
FIG. 1 illustrates an example system for fine-grain segmentation in video.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Methods, devices, apparatuses, computing platforms, and articles are described herein related to fine-grain object segmentation in video using deep features and multi-level graphical models.

As described above, it may be advantageous to provide fine-grain object segmentation for each video frame of a video sequence. The techniques discussed herein provide a multi-stage algorithm that renders quality segmentations in video data in a temporally coherent manner while requiring minimal input from a user. For example, for a video sequence of video frames, a ground truth segmentation of an object is received for the first video frame of the sequence. The ground truth segmentation is typically a binary pixel-wise data structure that provides a first value (e.g., one) for pixels that are a part of the object of interest and a second value (e.g., zero) for pixels that are not part of the object of interest (and are therefore part of the background). For example, the ground truth segmentation may be a binary object mask. Using the ground truth segmentation, a segmentation is then determined for a second, temporally subsequent, video frame using the multi-stage algorithm discussed herein.

In some embodiments, a bounding box for the object in the first video frame is generated by providing a perimeter and padding around the ground truth segmentation. A bounding box in the second video frame is then generated using a convolutional neural network (CNN) based Siamese tracker as is discussed further herein. As used herein, the term CNN indicates a network that includes at least one convolutional layer, which convolves one or more filters with input volume feature maps (or the input video frame) to generate output feature maps. Furthermore, object landmark tracking (such as facial landmark tracking) is performed for the video sequence. Notably, the landmark tracking may track landmarks that are part of the ground truth segmentation and/or different landmarks. For example, facial landmark tracking may be used while the object of the ground truth segmentation is not necessarily a component of the face, although it may be related. For example, the object landmarks and the object of the segmentation may both correspond to foreground objects but they do not necessarily have to be or be part of the same object.

Using the bounding box of the first video frame and the ground truth segmentation, a color mixture model, including, for example, foreground and background Gaussian mixture models (GMMs), are trained using the region within the bounding box. As used herein, the term region indicates an area of pixel locations and their corresponding values, which may be color values (e.g., R, G, B values) or any other pixel-wise values as discussed herein. Then, the color mixture model is applied to the bounding box of the second video frame to generate color based probabilities for pixels of the bounding box of the second video frame. For example, the color based probabilities may include a value for each pixel indicative of whether the pixel is part of the object of interest. Notably, the color of the object may be expected to be relatively consistent between frames such that a color mixture model implementing any number of mixtures in foreground/background mixture models (e.g., GMMs) may be implemented to determine the color probability values.

Furthermore, an optical flow technique is implemented with respect to at least the ground truth segmentation and the bounding box in the second video frame to determine a motion vector for the segmentation and corresponding to the video frames. The ground truth segmentation is then translated to a location in the second video frame using the motion vector (e.g., a mean motion vector from a dense optical flow between the ground truth segmentation and the bounding box). Notably, the resultant binary shape estimation (e.g., including the shape of the ground truth segmentation in a new location) may include pixel-wise values indicating whether the pixel is part of the object. A distance transform is applied to the binary shape estimation to generate a weak (e.g., non-binary) shape estimation that is in the same location but that maintains higher values at or toward the center of the shape and lower values at or toward the perimeter of the shape. Notably, it is expected that the object will not merely translate and maintain shape between frames and the weak shape estimation is used to account for such changes in shape.

An affine transform, determined using the previously discussed landmark tracking, is then applied to the weak shape estimation to transform the weak shape estimation to a new shape and/or location based on the detected transformation of the landmarks between frames. In some embodiments, an affine transform matrix or other data structure is generated based on the translation of corresponding landmarks between frames and the resultant affine transform matrix or other data structure is applied to the weak shape estimation to generate the updated weak shape estimation (e.g., a second weak shape estimation). The updated weak shape estimation includes shape and motion based probabilities for pixels within the bounding box of the second video frame such that the shape and motion based probabilities may include a value for each pixel indicative of whether the pixel is part of the object of interest.

The shape and motion based probability values and the previously discussed color based probability values are then merged to generate final probability values for pixels of the bounding box of the second video frame (and additional pixels as needed). Such final probability values may be generated, for example, by pixel-wise multiplication of the shape and motion based probability values and the color based probability values. However, any merge techniques may be used. In some embodiments, the final probability values may be thresholded to determine a segmentation of the object in the second video frame such that final probability values above the threshold are set to the first value (e.g., one) and final probability values at or below the threshold are set to the second value (e.g., zero).

However, since the final probability values or scores (which may be characterized as a foreground mask) may contain discontinuities, noise, etc., in some embodiments, a graphical model segmentation-based enhancement is applied to generate the segmentation. In some embodiments, a graph based energy summation model having a unary energy term based on the final or merged per-pixel probability scores, a pairwise energy term based on color differences between neighboring pixels, and a super pixel energy term based on super pixel boundaries is generated and solved (or approximated), as discussed further herein.

For example, the solution may find a segmentation of the object that minimizes the graph based energy summation model with the unary energy term summing function results indicative of a disagreement between a pixel of a candidate segmentation and the final probability score for the pixel (e.g., the function returning a high number when the candidate segmentation has a pixel labeled as background when it has a high final probability score or vice versa), the pairwise energy term summing function results indicative of pixel pairs (i.e., neighboring pixels) that have similar or the same colors being separated between foreground and background (or vice versa), and the super pixel energy term summing function results indicative of pixels that are part of a super pixel and in background segmentation while the super pixel is otherwise almost entirely part of the foreground segmentation (or vice versa). For example, the unary term punishes pixel segmentations that do not match the final or merged probability score, the pairwise term punishes pixel segmentations that have neighboring pixels with the same or similar colors in differing segmentations, and the super pixel term punishes pixel segmentations that have one or few pixels in a super pixel that do not agree with the dominant segmentation of the super pixel. The graph based energy summation model may be solved or approximated using any suitable technique or techniques such as Boykov-Kolmogorov techniques to determine a segmentation for the object (e.g., a binary object mask) that minimizes the model. As used herein, the terms solved or solution or similar terms indicate a solution that is not necessarily the exhaustive best solution but is arrived by applying a solver.

The segmentation for the object for the second frame is then used in place of the ground truth segmentation discussed above and the techniques are repeated to determine a segmentation for the object for a third temporally subsequent frame, and so on. Such techniques provide robust and accurate, fine-grain segmentation in video (e.g., video data) that requires very little or no user interaction (beyond the initial ground truth segmentation). Furthermore, the discussed techniques provide the advantages of being modular, general, class-agnostic, flexible, and computationally efficient. Notably, the use of bounding boxes (or deep attentive regions) makes the segmentation and, in particular, solving the graph based energy summation model that implements unary, pairwise, and super pixel based energies, computationally feasible such that the segmentation is highly spatially and temporally coherent. Furthermore, the components of the system may be advantageously fine tuned for task specific tasks. Such tunable parameters include the number of mixtures in the foreground/background GMMs (e.g., three), distance transform metrics, neighborhood size of for the graph based energy summation model (e.g., $\frac{8}{4}$), model parameters for the graph based energy summation model (e.g., Potts model parameters for the pairwise energy term), energy potential coefficients for the graph based energy summation model, and number of super pixels and/or super pixel generation method for the super pixel energy term.

The techniques discussed herein provide for efficient and robust propagation of class-agnostic object segmentation in video in a temporally-coherent manner, using color, shape and motion features. In some embodiments, the techniques include determining attentive regions (or bounding boxes or proposed bounding boxes) using Siamese tracking, generating color mixture models (e.g., GMM-based background/foreground models), estimating a probability map for the segmentation (or shape prior) using optical flow and deep facial landmarks, and applying a graphical model segmentation-based enhancement to generate a final segmentation.

FIG. 1 illustrates an example system 100 for fine-grain segmentation in video, arranged in accordance with at least some implementations of the present disclosure. System 100 includes a bounding box module 101, a Siamese tracker 102, a color mixture model module 103, an optical flow module 104, a translation module 105, a distance transform module 106, an affine transform module 107, a landmark tracking module 108, a merge module 109, an energy minimization model module 110, and a solver 111. As shown, system 100 receives input video 121 and a ground truth segmentation 122 and system 100 generates one or more segmentations 133 such that ground truth segmentation 122 segments a first frame of input video into object region(s) (i.e., a foreground) and non-object region(s) (i.e., a background).

System 100 may include a processor, memory, etc. implemented via any suitable form factor device as discussed herein to generate segmentation 133. For example, system 100 may be implemented as a personal computer, a laptop computer, a tablet, a phablet, a smart phone, a digital camera, a gaming console, a wearable device, a display device, an all-in-one device, a two-in-one device, or the like. For example, system 100 may perform fine grain segmentation of video frames of input video 121 as discussed herein. In some embodiments, system 100 further includes one or more image capture devices to capture input video 121 although input video 121 may be received from another device.

System 100 receives input video 121 and ground truth segmentation 122. Input video 121 may include any suitable video frames, video pictures, sequence of video frames, group of pictures, groups of pictures, video data, or the like in any suitable resolution. For example, the video may be video graphics array (VGA), high definition (HD), Full-HD (e.g., 1080p), 2K resolution video, 4K resolution video, 8K resolution video, or the like, and the video may include any number of video frames, sequences of video frames, pictures, groups of pictures, or the like. In some embodiments, input video 121 is downsampled prior to processing. Techniques discussed herein are discussed with respect to video frames for the sake of clarity of presentation. However, such frames may be characterized as pictures, video pictures, sequences of pictures, video sequences, etc. In some embodiments, input video has three channels such as RGB channels, although other formats such as YUV, YCbCR, etc. may be used.

Ground truth segmentation 122 includes any data structure that indicates pixels of a first video frame of input video 121 are part of an object. For example, ground truth segmentation 122 may include first values (e.g., one) for pixels of input video 121 that are part of an object of interest and second values (e.g., zero) for pixels of input video 121 that are not part of the object of interest such that ground truth segmentation 122 is a binary mask. Herein, the terms object, object of interest, and foreground are used interchangeably to indicate an item that is to be tracked and for which a segmentation is to be provided. As used herein, the term segmentation indicates a data structure indicative of the object or foreground such that the segmentation indicates the location and shape of the object or foreground in a video frame.

Figure 2:
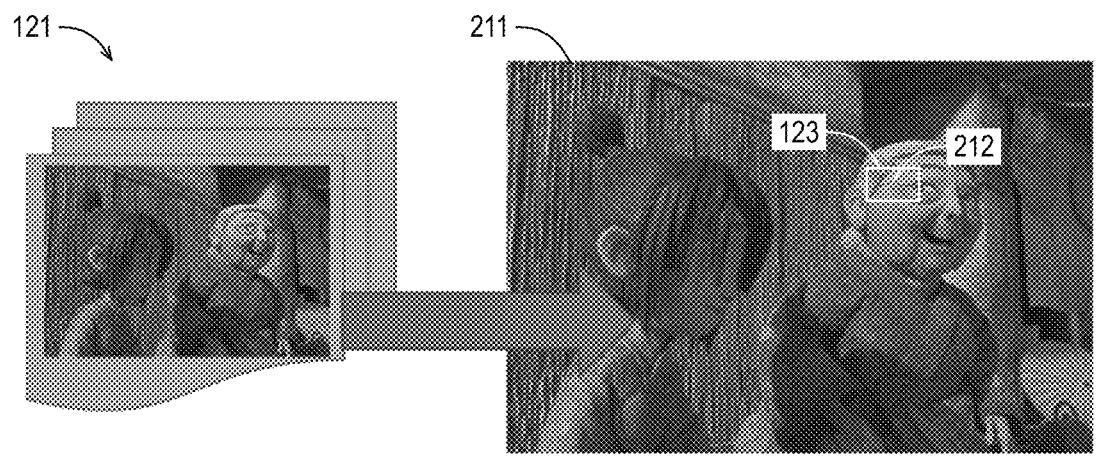
FIG. 2 illustrates an example video frame of input video including an object for segmentation.

FIG. 2 illustrates an example video frame 211 of input video 121 including an object 212 for segmentation, arranged in accordance with at least some implementations of the present disclosure. As shown in FIG. 2, for video frame 211 (e.g., a first video frame of a video sequence), segmentation is to be provided in subsequent video frames for object 212 (which is illustrated within a bounding box 123, as discussed further below). In the examples illustrated herein, the object of interest is a seam artifact between portions of facial molds. For example, in order to animate faces, facial molds may be swapped or rendered from frame to frame, which renders an undesirable seam artifact between the facial molds. It is desirable to track and in-paint the seam to render a final frame of video that is pleasant to a viewer. The techniques discussed herein automate the segmentation of the seam artifact by providing a frame-wise segmentation with the foreground including the seam artifact. The segmentation may then be used to automate, at least partially, the in-painting and elimination of the seam artifact. Although illustrated with respect to a seam artifact for the sake of clarity of presentation, object 212 may be any object type such as a face, a part of a face, an animal, a vehicle, and so on.

For example, with reference to FIG. 1, system 100 receives a video clip (i.e., input video 121), $\{F_i\}_{i=1}^{N}$, including any number, N, of frames, $F_i$. For the first frame of the video clip (e.g., the first frame in a temporal order), $F_1$, ground truth segmentation 122, $S_1$, is provided. Ground truth segmentation 122 may be generated using any suitable technique or techniques such as computer vision techniques or manual pixel selection techniques.

Figure 3:
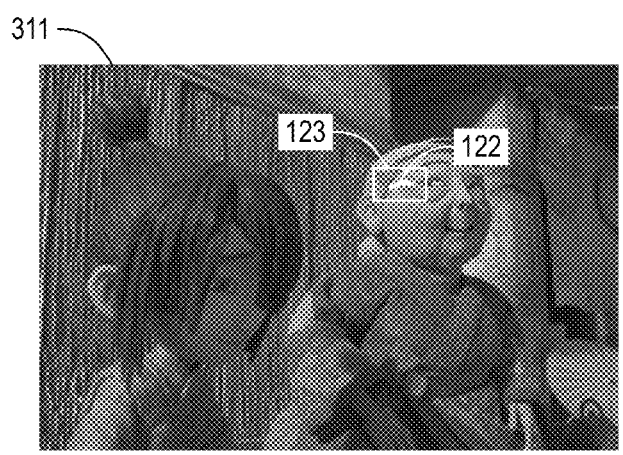
FIG. 3 illustrates an example ground truth segmentation of an object in an example video frame.

FIG. 3 illustrates an example ground truth segmentation 122 of an object in an example video frame 311, arranged in accordance with at least some implementations of the present disclosure. As shown in FIG. 3, for video frame 311 (e.g., an exemplary first video frame of a video sequence), segmentation is to be provided in subsequent video frames for an object that is defined by ground truth segmentation 122. Furthermore, ground truth segmentation 122 is within bounding box 123, as discussed further herein. Ground truth segmentation 122 may provide a value such as one or a mask or the like such that all pixels of ground truth segmentation 122 are part of the object of interest and all other pixels are not. Although illustrated with respect to ground truth segmentation 122, the illustrated segmentation may be any of ground truth segmentation 122 or segmentations 133 (e.g., segmentations generated using the discussed techniques).

Returning to FIG. 1, ground truth segmentation 122 is received by bounding box module 101, which defines a bounding box 123, $B_1$ (also illustrated as BB(1)), around ground truth segmentation 122 such that all pixels of ground truth segmentation 122 are within ground truth segmentation 122 and a padding of pixels is provided around ground truth segmentation 122. With reference to FIG. 3, ground truth segmentation 122 is entirely within bounding box 123 and at least one pixel of padding is between each perimeter pixel of ground truth segmentation 122 and bounding box 123. Bounding box 123 may be any suitable shape such as a square or rectangle or other. In some embodiments, bounding box 123 has a shape conducive to the application of other modules of system 100.

Siamese tracker 102 receives bounding box 123 and input video 121 (or pertinent portions thereof) and Siamese tracker 102 determines subsequent attentive regions or bounding boxes 124, $\{B_i\}_{i=2}^{N}$ (also illustrated as BB(N)). Herein, bounding boxes 124 may be characterized as attentive regions, regions of interest, etc. as they are the regions likely to be inclusive of the object for which segmentation is being provided.

Figure 4:
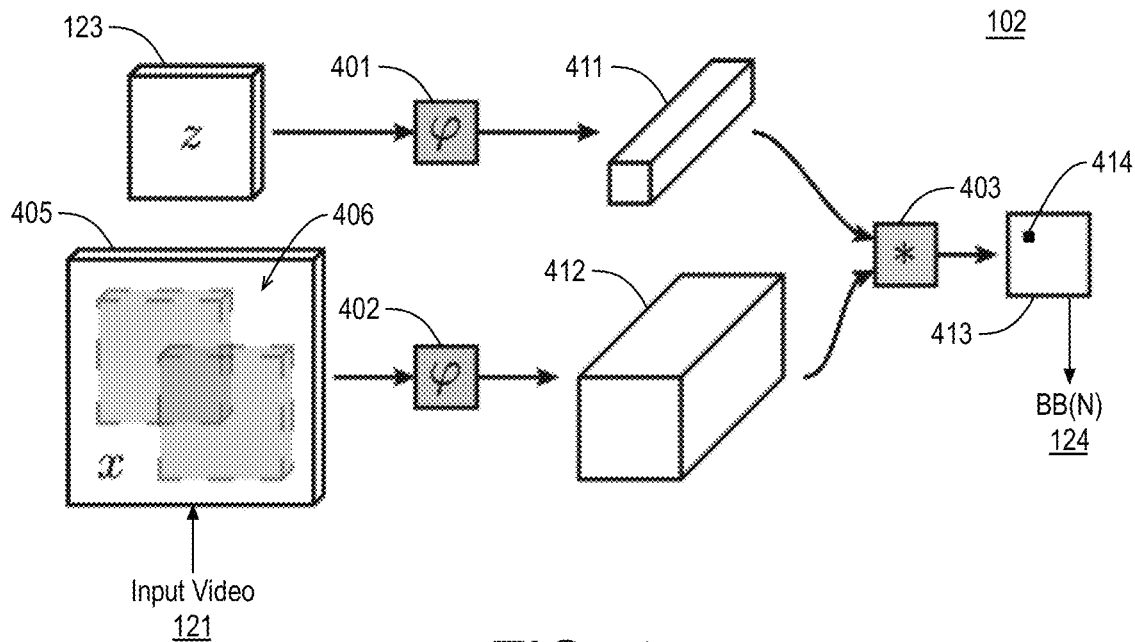
FIG. 4 illustrates an example Siamese tracker for determining bounding boxes for subsequent video frames.

FIG. 4 illustrates an example Siamese tracker 102 for determining bounding boxes for subsequent video frames, arranged in accordance with at least some implementations of the present disclosure. As shown in FIG. 4, Siamese tracker 102 receives bounding box 123 and input video 121 and Siamese tracker 102 generates bounding boxes 124, one for each subsequent frame of input video 121. Also as shown, Siamese tracker 102 implements convolutional neural networks 401, 402 (indicated by phi) to generate feature maps or volumes. In some embodiments, convolutional neural networks (CNNs) 401, 402 are the same (e.g., having the same architecture and weights), although they may be different. CNN 401 is applied to bounding box 123 (or a subsequent bounding box) to generate a feature map or feature vector 411, which also may be characterized as a feature embedding of the image of bounding box. For example, CNN 401 may be applied to an input volume including three channels: one for each color channel of the pixel values of an image region within bounding box 123. The input volume may therefore have a depth of three (color channels) and a height and width defined by the size of bounding box 123, which may be predefined. In FIG. 4, the input volume corresponding to bounding box 123 is represented as z and may be characterized as an exemplar or archetype. Feature vector 411 may have any suitable data structure such as a vector of features (e.g., values) from CNN 401. In some embodiments, feature vector 411 may include features implemented with respect to object detection techniques. As discussed, feature vector 411 is an embedding (or encoding) of the image region within bounding box 123.

Furthermore, CNN 402 is applied to a search region 405 such that search region 405 is a part of or all of a subsequent frame (in temporal order) of input video 121. For example, search region 405 may define an input volume, x, having a depth of three (for the color channels of the subsequent video frame) and a width and height within the video frame that is the video frame itself a portion thereof (e.g., a predefined sized search region, such as 2× in each direction of bounding box 123, centered at a location collocated with bounding box 123). Notably, limiting the size of search region 405 provides reduced computations and little to no loss in tracking. As shown, application of CNN 402 to search region 405 (e.g., an input volume corresponding to the search region) generates feature maps or feature volume 412. Notably, feature volume 412 may include a feature vector (e.g., a vector of embedding or encoding values) from CNN 402 for each patch of the same size as bounding box 123 within search region 405. That is, CNN 402 may be applied to each of multiple bounding box sized candidates 406 within search region 405 to generate a feature vector for each candidate 406 such that the feature vectors together make up feature volume 412.

Feature vector 411 and feature volume 412 are then convolved at convolution operation 403 to generate a score map 413 having a score for each of candidates 406. As shown, a highest scoring candidate 414 among all of candidates 406 is provided as a selected bounding box 124 for the video frame. For example, a bounding box for a subsequent video frame (with respect to the video frame of bounding box 123) is selected, the processing is repeated using the selected bounding box to select a bounding box for another subsequent frame, and so on. Selected bounding box 124 may have any suitable data structure such as a location within the video frame of input video 121 of a top left corner or a center of bounding box 124. In some embodiments, bounding box 124 has the same size and shape as bounding box 123 and the size thereof is known.

Figure 5:
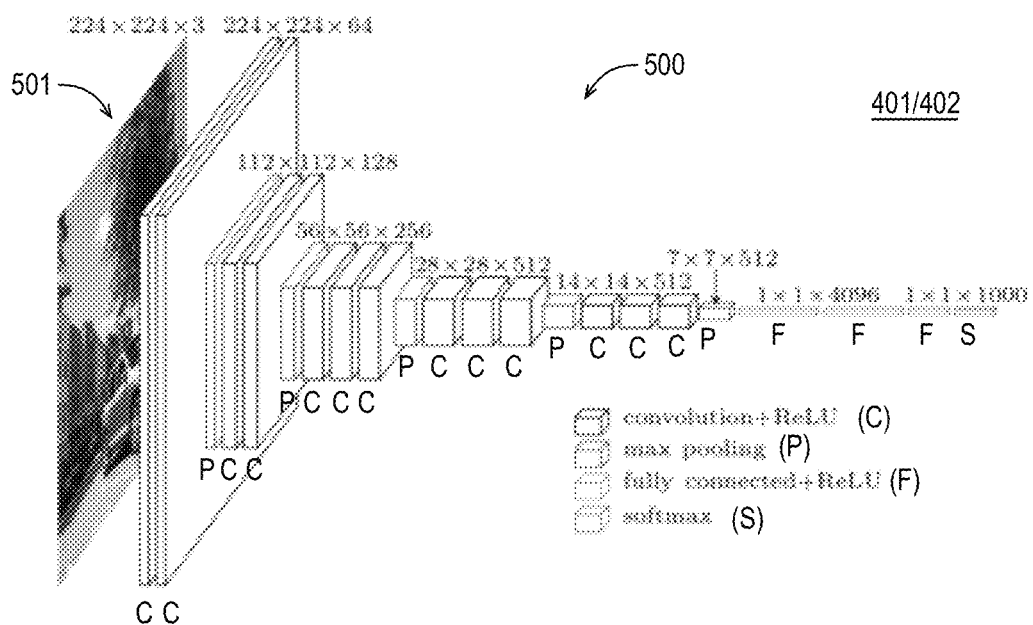
FIG. 5 illustrates an example convolutional neural network for implementation in a Siamese tracker.

FIG. 5 illustrates an example convolutional neural network 500 for implementation in a Siamese tracker, arranged in accordance with at least some implementations of the present disclosure. For example, convolutional neural network (CNN) 500 may be implemented as one or both of CNNs 401, 402 in Siamese tracker 102. As used shown, CNN 500 may include convolutional and rectified linear unit (ReLu) layers (labeled with a C), max pooling layers (labeled with a P), fully connected layers (labeled with a F), and a softmax function or layer (labeled with a S) to generate a feature vector or map having values that encode or embed an input volume 501 (e.g., bounding box 123 or a candidate region 406). CNN 500 may be any suitable CNN having any architecture such that it includes one or more convolutional layers and provides an output feature vector or map. CNN 500 is pretrained using any suitable data set and ground truth data. In an embodiment, CNN 500 has a VGG-16 architecture, which includes alternating layers of convolutional and pooling operations with non-linearity (e.g., ReLU) followed by a fully connected layer or layers and a softmax operation. The output of CNN 500 (e.g., a feature vector or map) represents the network feature embedding of input volume 501 (e.g., an original image).

Returning to FIG. 4, as discussed, for bounding box tracking (e.g., attentive region generation), Siamese tracker 102 (or a Siamese network) is implemented. Siamese tracker 102 is pre-trained and may be implemented as a fully-convolutional Siamese network as shown in FIG. 4. In some embodiments, Siamese tracker 102 is trained to learn a general-purpose similarity measure between two images. For example, Siamese tracker 102 may be advantageously implemented in one-shot learning domains such as tracking. When translations of an archetype (z) as provided by bounding box 123 are present in search region 405 (x) (denoted x in FIG. 2), Siamese tracker 102 returns a large, positive score in score map 413 while regions or objects produce negative scores in score map 413. In some embodiments, Siamese tracker 102 is built from a deep architecture to produce an accurate similarity measure that is robust to different object transformations (e.g. translations, illumination variations, morphological changes, rotations, etc.) for objects within bounding box 123. Following the CNN-based embedding as provided by CNNs 401, 402, feature vector 411 for the exemplar (bounding box 123) and feature volume 412 for the candidate regions are convolved to produce a spatially-meaningful grid of Siamese-based similarity scores in score map 413 that indicate the current location of the tracking object. For example, the highest score in score map 413 corresponds to the most likely bounding box tracking for the object in bounding box 123. In some embodiments, convolution operation 403 provides a fully-convolutional network and significantly reduces the number of overall computations required for tracking. In some embodiments, a running average of exemplars from previous video frames may be maintained for improved tracking robustness.

Returning to FIG. 1, bounding box 123 and bounding boxes 124 (one for each frame of input video 121) are provided to color mixture model module 103, which generates, for each of bounding boxes 124, color probabilities 125. For example, using the region within bounding box 123 (e.g., the three color channel video data for pixels within bounding box 123) and ground truth segmentation 122, from a first video frame, color mixture model module 103 generates one or more color mixture models such as foreground and background mixture models for any number of color mixtures that indicate colors within ground truth segmentation 122 (e.g., in the foreground) and those outside of ground truth segmentation 122 (e.g., in the background). Such color mixture models are then applied to bounding box 124 (e.g., the three color channel video data for pixels within bounding box 124) from a second video frame to provide pixel-wise color probabilities for pixels within bounding box 124 such that each color probability indicates a likelihood the pixel is part of the object corresponding to ground truth segmentation 122. For subsequent frames, such processing is repeated using segmentations 133 for a current frame generated as discussed further herein, the bounding box for the current frame, and a bounding box for the temporally subsequent frame.

Figure 6:
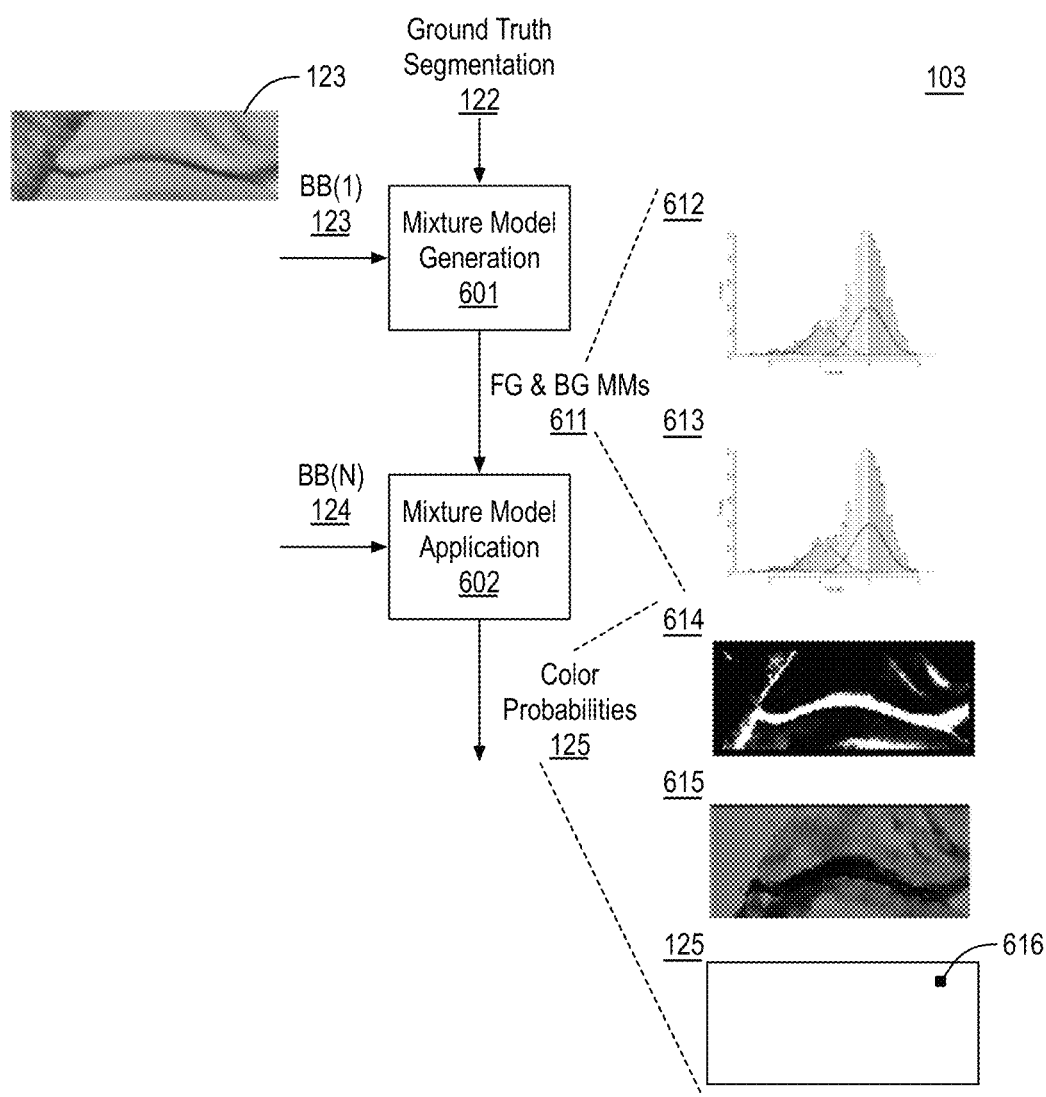
FIG. 6 illustrates an example color mixture model module for generating color based probabilities.

FIG. 6 illustrates an example color mixture model module 103 for generating color probabilities 125, arranged in accordance with at least some implementations of the present disclosure. As shown in FIG. 6, color mixture model module 103 may include a color mixture model generation module 601 and a color mixture model application module 602. In some embodiments, color mixture model generation module 601 and color mixture model application module 602 may be implemented together. Color mixture model generation module 601 may generate one or more color mixture models such as foreground and background mixture models 611. In some embodiments, color mixture models are generated using ground truth segmentation 122 and bounding box 123 and such color mixture models are applied to all subsequent bounding boxes 124. In other embodiments, the color mixture models may be modified based on subsequent segmentations and bounding boxes or new color mixture models may be generated based on subsequent segmentations and bounding boxes.

As shown, foreground color model 612 and background color model 613 may provide probabilities or probability functions that a pixel is part of a foreground or background based on the color of the pixel. Foreground color model 612 and background color model 613 are applied to pixels of a subsequent bounding box 124 to generate color probabilities including foreground probabilities 614, background probabilities 615, and resultant color probabilities 125 that include, for each pixel of bounding box 124, a color based probability that the pixel is part of the object of interest (e.g., part of the foreground), as illustrated with respect to color based probability 616 for the pixel corresponding thereto.

In some embodiments, color mixture model generation module 601 and color mixture model application module 602 may implement Gaussian mixture models with foreground/background classification (e.g., in the RGB color space) determined by a Bayes classifier to generate color probabilities in accordance with Equation (1):

$$p\left(\text{foreground}\Big|\underset{\text{input pixel}}{x}\right) = \underset{\text{foreground prior}}{\underline{p(\text{foreground})}} \prod_{f_i \in \text{foreground clusters}}^{K} \underset{\text{foreground GMM}}{\underline{N(x|f_i)}} \quad (1)$$

where p(a|b) indicates a probability of being a member of a, foreground indicates a pixel is part of the object of interest, x (as shown) is an input pixel, p(foreground|x) therefore indicates a probability an input pixel is part of an object of interest, p(foreground) indicates a probability from a prior bounding box that the pixel was part of the foreground (e.g., from color probabilities 125 from a previous bounding box or final probabilities 131 for a previous bounding box), K is a number of color clusters (or mixtures) being implemented, $f_i$ indicates each foreground cluster, and N is a normal probability function.

Returning to FIG. 1, color probabilities 125 are provided to merge module 109 for merge with shape and motion probabilities 129, as discussed further herein below. As shown, optical flow module 104 receives bounding boxes 124, segmentations 133 (including ground truth segmentation 122), and input video 121 (as needed). Optical flow module 104 determines a dense optical flow (e.g., pixel-wise motion vectors between a segmentation of a current frame, $S_{i-1}$, and a bounding box of a temporally subsequent frame, $B_i$. Based on the dense optical flow, a motion vector 126, is determined for the segmentation (e.g., ground truth segmentation 122 or a subsequent segmentation 133). In an embodiment, motion vector 126 is a mean of the motion vectors of segmentation $S_{i-1}$.

Translation module 105 receives motion vector 126 and of segmentation $S_{i-1}$ and translation module 105 generates a binary shape estimation 127 for the current frame, $F_i$, by translating the segmentation $S_{i-1}$ along motion vector 126. As used herein, the term shape estimation and similar terms include both the shape and location of an object within a video frame. Such estimations may be binary or weak. Binary estimations have values of, for example, one for pixels deemed within the object and zero for pixels outside the object while weak estimations have values in a particular range with a particular granularity to indicate probabilities the pixels are within the object.

Binary shape estimation 127, thereby, provides a estimated shape and location of an object of interest (e.g., as provided by ground truth segmentation 122 or a subsequent segmentation 133) in a subsequent frame by translation of the segmentation of the previous frame along motion vector 126 to the current frame. Binary shape estimation 127 is received by distance transform module 106, which applies a distance transform to binary shape estimation 127 to generate weak shape estimation 128. Distance transform module 106 may apply any suitable distance transform that translates the binary values of binary shape estimation 127 to non-binary values based on a distance of the corresponding pixel from a center of the object. That is, probability values of weak shape estimation 128 are the greatest at (or within a particular distance of) the center of the represented shape (or along one or more center axes of the shape) and at the least at a perimeter of the shape. The function that provides the reduction from the center to the perimeter may be any function such as a linear function. Furthermore, the center (or one or more center axes) may be determined using any suitable technique or techniques such as centroid techniques and the distance from the center for each pixel may be generated using any suitable distance such as Euclidian distance or Manhattan distance.

Figure 7:
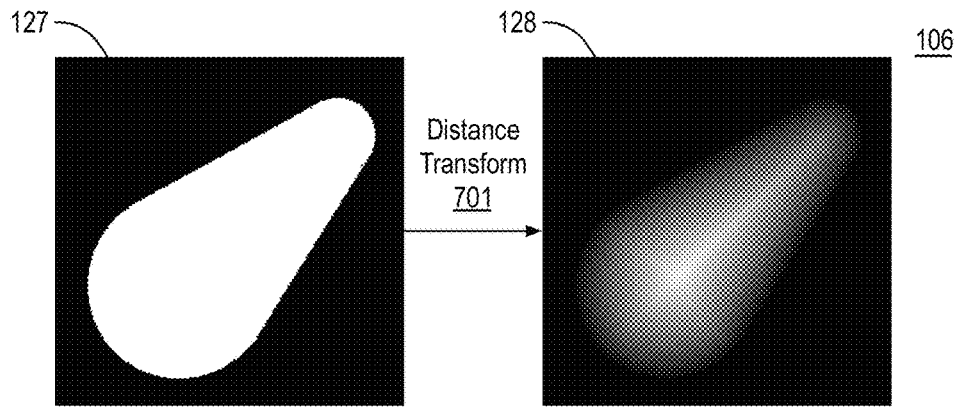
FIG. 7 illustrates an example distance transform as applied by distance transform module to an example binary shape estimation to generate an example weak shape estimation.

FIG. 7 illustrates an example distance transform 701 as applied by distance transform module 106 to an example binary shape estimation to generate an example weak shape estimation, arranged in accordance with at least some implementations of the present disclosure. As shown in FIG. 7, binary shape estimation 127 provides an estimated shape using foreground or object pixel values (in white) of a first value and background or non-object pixel values (in black) of a second value. Distance transform module 106 applies distance transform 701 to determine weak shape estimation 128 that has pixel wise values within a particular range and a particular granularity (e.g., 0 to 100 by ones or 0.00 to 1.00 by one-hundredths) such that the values provide a score or probability that the pixel is a part of the foreground or object. Such probability values may be characterized as non-binary for example. Weak shape estimation 128 may then be used as a non-binary mask to combine with other probabilities (e.g., color based probabilities) to generate scores or pixel-wise probabilities that may be further manipulated (e.g., by solving an energy based model as discussed further below) to generate a final (binary) segmentation. As shown in FIG. 7, pixels at or near the center of the object of interest of weak shape estimation 128 have higher values (e.g., higher likelihoods the pixels are part of the object of interest) and pixels at or near the perimeter have lower values (e.g., lower likelihoods the pixels are part of the object of interest). Such values may be determined using any suitable distance transform function.

Returning to FIG. 1, input video 121 is provided to landmark tracking module 108, which detects and tracks object landmarks in input video 121. In some embodiments, landmark tracking module 108 tracks landmarks that are relevant to the object of ground truth segmentation 122 but not necessarily part of the object. For example, landmark tracking module 108 may detect and track facial landmarks within input video 121. Such landmarks are typically part of a foreground of a video frame and the movement and deformation thereof may be indicative of the movement and deformation of other objects of interest in a scene. That is, object of interest movement may be approximated by face landmark detection and tracking both when the object of interest is part of a face (or contiguous with a face) and when the object of interest and the face(s) are both merely part of the foreground of a scene. Notably, when the object of interest is part of a scene background other landmarks may be detected and used.

As shown, landmark locations 130, $\{L_i\}_{i=1}^{N}$, are provided by landmark tracking module 108 such that landmark locations 130 are provided for each of the N frames. Landmark locations 130 may include any suitable data structure such as a location and descriptor for each of the landmarks detected. Such landmarks may, as discussed, be any landmarks such as facial landmarks (e.g., eyes, nose, lips, or components thereof, etc.) or other landmarks including corners, edges, etc. In an embodiment, landmark tracking module 108 applies a pre-trained face tracker to render facial landmark locations across all frames of input video 121.

Landmark locations 130 and weak shape estimation 128 are received by affine transform module 107, which determines, for the current video frame with respect to the previous video frame, an affine transformations based on the change in positions of landmark locations 130 for each of the frames. For example, the affine transformation between frames $F_{i-1}$ and $F_i$ is generated based on the change in landmark locations between landmark locations $L_{i-1}$ and landmark locations $L_i$. The affine transformation may be determined using any suitable technique or techniques such as affine transform model fitting techniques. Weak shape estimation 128 is then transformed based using the affine transform (e.g., by application of an affine transform matrix) to generate shape and motion probabilities 129.

Shape and motion probabilities 129 include pixel-wise probability values for each pixel of at least bounding box 124 that indicate a probability the pixel is part of the object of interest. Such probability values are characterized as shape and motion probabilities 129 since they are generated based on translation (e.g., using optical flow) of a prior binary segmentation (e.g., ground truth segmentation 122 or a subsequent segmentation 133, distance transform of the translated binary segmentation, and affine transformation (e.g., determined using landmark tracking) of the weak shape estimation. Although discussed with respect to an order of operation of translation, distance transform, affine transformation, such operations may be performed in any order to generate shape and motion probabilities 129.

Shape and motion probabilities 129 and previously discussed color probabilities 125 are received by merge module 109. As discussed, both shape and motion probabilities 129 and color probabilities 125 include pixel-wise probability values, based on shape and motion and color, respectively, for each pixel of at least bounding box 124 such that the probability values indicate probabilities the pixel is part of the object of interest. Merge module 109 may merge shape and motion probabilities 129 and color probabilities 125 using any suitable technique or techniques to generate merged probabilities 131. Merged probabilities 131 may also be characterized as final probabilities or shape, motion, and color based probabilities or merged probabilities 131 may be collectively be characterized as an approximate foreground mask. In some embodiments, shape and motion probabilities 129 and color probabilities 125 are multiplied in a pixel-wise manner to generate merged probabilities 131. In some embodiments, shape and motion probabilities 129 and color probabilities 125 are multiplied and a sigmoid function is applied to the pixel-wise products to determine merged probabilities 131.

In some embodiments, merged probabilities 131 are used to generate segmentation based on thresholding techniques such that probabilities that compare favorably (e.g., are greater than) to a particular threshold value are assigned to the foreground or object of interest and probabilities that compare unfavorably to the particular threshold (e.g., are less than or equal to) are assigned to the background. However, since merged probabilities 131 may include discontinuities, noise, etc., graphical model segmentation based enhancement may be advantageously applied as discussed with respect to energy minimization model module 110 and a solver 111.

Energy minimization model module 110 receives merged probabilities 131 and generates a graph based energy summation model 132 that provides an energy minimization problem. Solver 111 is employed to solve (or approximate a solution to) graph based energy summation model 132 to provide segmentation 133. That is, segmentation 133 provides a segmentation (e.g., a binary segmentation) that minimizes graph based energy summation model 132. Graph based energy summation model 132 provides penalties for candidate segmentations violating various constraints and, as discussed, segmentation 133 minimizes those penalties. As discussed, segmentation 133 is then used in place of ground truth segmentation 122 for subsequent video frames and processing may be repeated as discussed for all video frames of input video 121.

Figure 8:
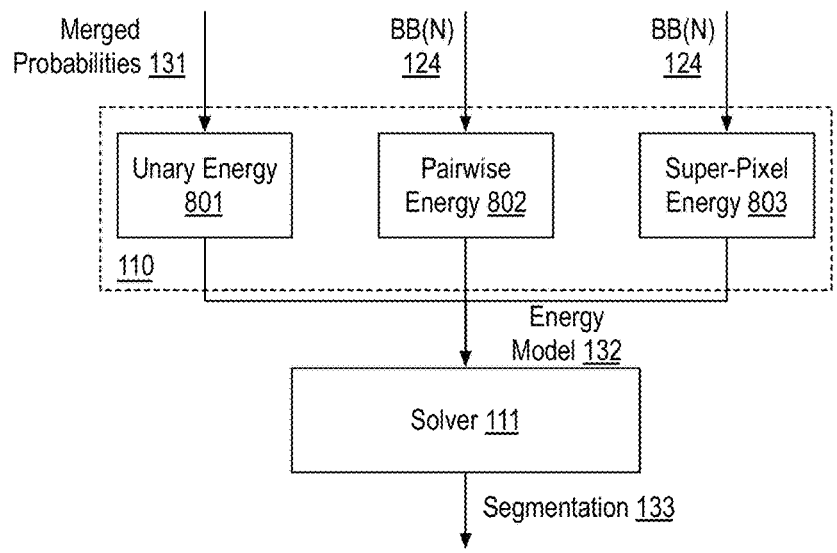
FIG. 8 illustrates an example energy minimization model module and solver.

FIG. 8 illustrates an example energy minimization model module 110 and solver 111, arranged in accordance with at least some implementations of the present disclosure. As shown in FIG. 8, energy minimization model module 110 may include a unary energy term module 801, a pairwise energy term module 802, and a super-pixel energy term module 803 that generate a unary energy term, a pairwise energy term, and a super-pixel energy term, respectively, that may be summed to provide graph based energy summation model 132.

In some embodiments, energy minimization model module 110 generates a model for minimization in accordance with Equation (2):

$$E(x) = \sum_{i \in V} \psi_i(x_i) + \sum_{(i,j) \in E} \psi_{ij}(x_i, x_j) + \sum_{c \in S} \psi_c(x_c) \quad (2)$$

where $\psi_i(x_i)$ is a unary energy term (or unary potential), $\psi_{ij}(x_i, x_j)$ is a pairwise energy term (or pairwise potential), and $\psi_c(x_c)$ is a super pixel energy term (or super pixel potential).

As shown, the unary energy term, pairwise energy term, and super pixel energy term are summed to determine the graph based energy summation model. The unary energy term sums energies or potentials across vertices (V) such that the unary function provides greater values for a candidate segmentation (e.g., x represents a candidate segmentation with pixel-wise values of one or zero indicative of whether the pixels are included in the object) when the candidate segmentation for the pixel disagrees with the merged probability score for the pixel (from merged probabilities 131) and lesser values when the candidate segmentation and the merged probability scores agree. For example, the unary energy term provides for a greater unary energy value for a pixel in response to a candidate segmentation having a mismatch with respect to the final per-pixel probability score for the pixel. The unary energy term function ($\psi_i$) may be any suitable function that provides such results such as an absolute value of the difference between the candidate segmentation value for the pixel and the merged probability score for the pixel or a square of the difference. For example, the unary energy term provides a potential determined using the approximate foreground mask (merged probabilities 131).

The pairwise energy term sums energies or potentials across edges (E) such that the pairwise energy term provides greater values when pairs of pixels ($x_i$, $x_j$) in a candidate segmentation within a particular neighborhood size are allocated to the same segmentation (foreground or background) but have the same or similar colors and provides lesser values (or zeroes) when pairs of pixels in a candidate segmentation are in the same segmentation and have the same or similar colors or when pixels of differing colors are in different segmentations. For example, the pairwise energy term provides for a greater pairwise energy value for a pair of pixels in response to the candidate segmentation having one of the pair of pixels within the object and the other outside the object and the pair of pixels having the same (or similar) color. In some embodiments, pairwise energy term ($\psi_{ij}$) is based on a contrast sensitive Potts model as shown in Equation (3):

$$\psi_{ij}(x_i, x_j) = \theta_p + \theta_v \exp(-\theta_\beta \lambda |I_i I_j|^2)$$

where $\theta_p$, $\theta_v$, and $\theta_\beta$ are trained or learned parameters, and $I_i$ and $I_j$ are the color vectors of $x_i$ and $x_j$, respectively. For example, the color vectors may be the RGB values (or other color space values) of the paired pixels or vector representations thereof. As shown in Equation (3), when the color vectors are the same, a maximum energy or potential (e.g., $\theta_p + \theta_v$) is attained when the pixels are not in the same segmentation. Such values penalize pixels of the same or similar colors that are not in the same segmentation. When the color vectors are very different, the minimum energy potential or a value close thereto (e.g., $\theta_p$) is attained when pixels of very different colors are in different segmentations (e.g., as may be expected).

The super pixel energy term sums energies or potentials across super pixels (S) or super pixel boundaries such that the super pixel energy provides greater values when pixels ($x_c$) within a particular super pixel are not allocated to the same segmentation (foreground or background) in a candidate segmentation and provides lesser values (or zeroes) when all pixels in a super pixel are in the same segmentation. The super pixel energy term provides a high order energy or potential to urge the selected segmentation to fit small contours (as identified by the super pixels). In some embodiments, bounding box 124 is first divided into super pixels using any suitable technique or techniques such as simple linear iterative clustering and the super pixels are used to determine the super pixel energy term. The super pixel energy term ($\psi_c(x_c)$) may apply any suitable function such as a per-pixel penalty for any pixels within a super pixel that are not in the same segmentation as the other pixels in the super pixel such that the other pixels are at least in a thresholded majority of pixels in the super pixel (e.g., more than 90% of the pixels are in the same segmentation).

For example, the super pixel energy term may provide, for a first candidate segmentation having all pixels of a super pixel within the object, a first super pixel energy value and, for a second candidate segmentation having at least one pixel of the super pixel outside the object and the remaining pixels within the object, a second super pixel energy value that is greater than the first super pixel energy value. In other examples, the super pixel energy term provides, for a first candidate segmentation having all pixels of a super pixel within the object, a first super pixel energy value and, for a second candidate segmentation having a percentage of pixels of a super pixel within the object that exceeds a threshold and at least one pixel of the super pixel outside the object, a second super pixel energy value that is greater than the first super pixel energy value. That is, when a particular super pixel has a threshold percentage of pixels within the foreground (or vice versa), it may be expected all pixels in the super pixel should be in the foreground and a penalty is otherwise provided. For example, for each super pixel, the percentage of pixels in the foreground (or background) may be determined and the percentage may be compared to a threshold. When the percentage is less than the threshold (e.g., 90% or 95% or the like), no assumption may be made about the segmentation of the super pixel and no penalty is applied. However, when the percentage exceeds the threshold, when any pixels are outside of the dominant segmentation, a penalty may be applied (e.g., a flat penalty or a per pixel penalty). When all pixels are in the dominant segmentation, no penalty is applied. Such penalties are summed as energies or potentials. Herein, such terms as energy, potential, penalty are used substantially interchangeably and indicate an outcome that is to be minimized.

Figure 9:
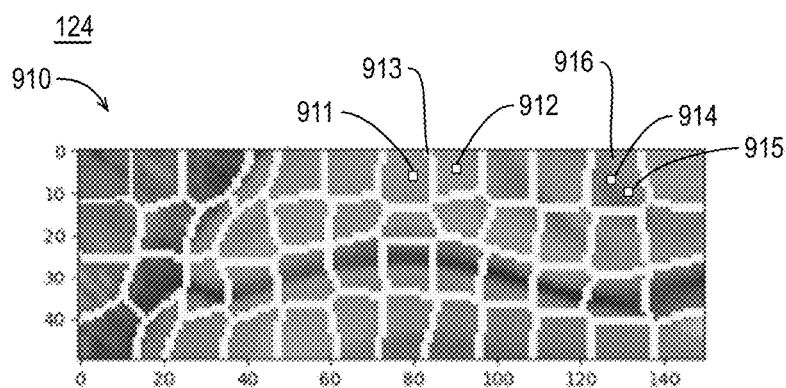
FIG. 9 illustrates example super pixels for an example bounding box.

FIG. 9 illustrates example super pixels 910 for an example bounding box 124, arranged in accordance with at least some implementations of the present disclosure. As shown, bounding box 124 may be divided into any number of super pixels 910 (only some of which are individually labeled for the sake of clarity) that are divided by super pixel boundaries 913. Super pixels 910 include any number or pixels and may have any size and shape. Bounding box 124 may be divided into non-overlapping super pixels 910 using any suitable technique or techniques such as simple linear iterative clustering techniques. Super pixels 910 tend to divide bounding box 124 into regions that have similar colors and/or gray levels, although other factors may be used. Notably, it may be expected that entireties of super pixels 910 be within the same segmentation (e.g., an object segmentation or a background segmentation).

As discussed with respect to FIG. 8, candidate segmentations that do not have entireties of super pixels 910 within the same segmentation may be penalized using any suitable technique or techniques. In an embodiment, when a pixel 914 and a pixel 915, both within the same super pixel 916, are in different segmentations (in a particular candidate segmentation), the discussed super pixel energy provides a penalty (high value). For example, when a percentage of the pixels of super pixel 916 are part of a particular segmentation (e.g., a foreground or background), a per-super pixel or a per-pixel penalty may be provided (as it violates the assumption all pixels in a super pixel be part of the same segmentation). As shown, for pixels that are separated by pixel boundary 913, such as pixel 911 and 912, in some embodiments, no assumption may be made as to whether the pixels are part of the same or different segmentations.

Returning to FIG. 8, as shown, graph based energy summation model 132 is solved by solver 111 to generate a final segmentation 133 for the current video frame. As discussed with respect to ground truth segmentation 122, segmentation 133 may be a binary mask including a first value (e.g., one) for pixels deemed to be part of the object to be tracked and a second value (e.g., zero) for pixels deemed to be outside of the object. Segmentation 133 is then used in place of ground truth segmentation 122 in subsequent processing. Graph based energy summation model 132 may be solved or approximated using any suitable technique or techniques. In an embodiment, graph based energy summation model 132 is solved using Boykov-Kolmogorov techniques. For example, Boykov-Kolmogorov techniques may be applied to approximate a min cut max flow solution to graph based energy summation model 132. Notably, the solution to graph based energy summation model 132 may be an approximate solution and not necessarily a best solution based on exhaustive techniques. As used herein, the term candidate segmentation indicates one or more pixel allocations to be evaluated in the solving of graph based energy summation model 132 and does not necessarily indicate a full candidate segmentation of a video frame or portion thereof. For example, per-pixel changes in segmentation evince different candidate segmentations.

Returning to FIG. 1, for yet subsequent frames of input video 121, segmentation 133 (e.g., a final binary segmentation) is used in place of ground truth segmentation, bounding box 124 is used in place of bounding box 123, and so on as iterative processing is performed to generate a segmentation of each video frame of input video 121 using the techniques discussed above.

Figure 10:
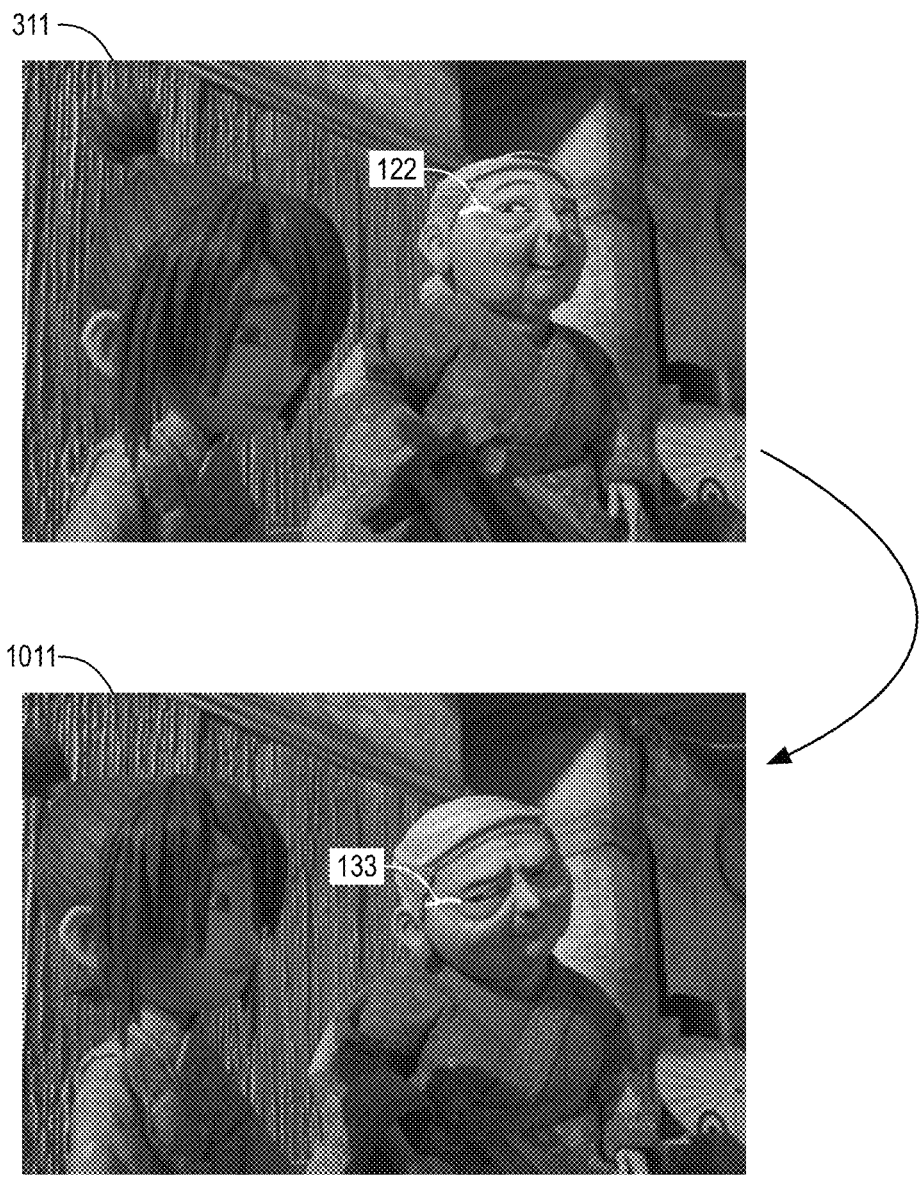
FIG. 10 illustrates example resultant segmentation of video frames.

FIG. 10 illustrates example resultant segmentation of video frames, arranged in accordance with at least some implementations of the present disclosure. As shown, ground truth segmentation 122 with respect to video frame 311 may be propagated through video to determine segmentation 133 for a temporally subsequent video frame 1011. In the illustrated example, video frame 1011 is about 40 frame subsequent to video frame 133 and segmentations 122, 133 identify a seam (e.g., the object of interest is a seam between facial parts of a computer generated puppet). As discussed, the disclosed techniques may be applied to any object type and return spatially and temporally coherent segmentations automatically (given ground truth segmentation 122). Such segmentations may be used in a wide variety of contexts such as video effects, artificial intelligence, object recognition, and so on.

Figure 11:
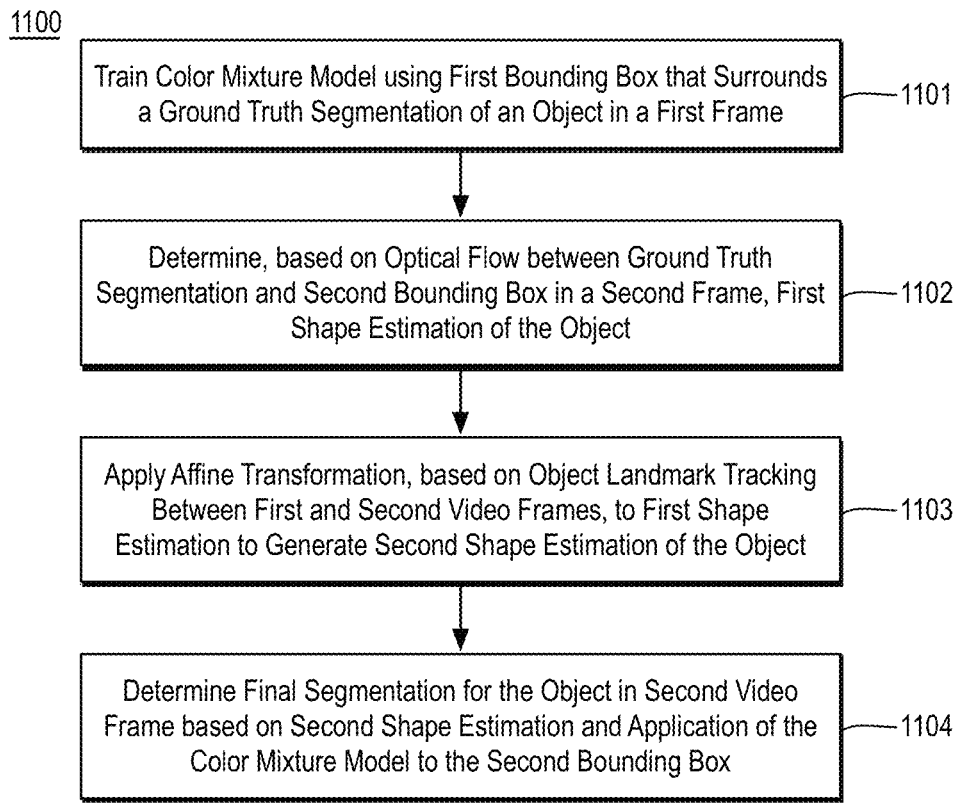
FIG. 11 is a flow diagram illustrating an example process for providing segmentation in video.

FIG. 11 is a flow diagram illustrating an example process 1100 for providing segmentation in video, arranged in accordance with at least some implementations of the present disclosure. Process 1100 may include one or more operations 1101-1104 as illustrated in FIG. 11. Process 1100 may form at least part of a video segmentation process. As used herein, the term video segmentation indicates segmenting one or more video frames of the video such that each pixel (or small pixel regions) of the video frames include indications of whether the pixel is within a particular region (e.g., object of interest region, primary region, etc.) of the video frame. By way of non-limiting example, process 1100 may form at least part of a video segmentation process performed by system 100 as discussed herein. Furthermore, process 1100 will be described herein with reference to system 1200 of FIG. 12.

Figure 12:
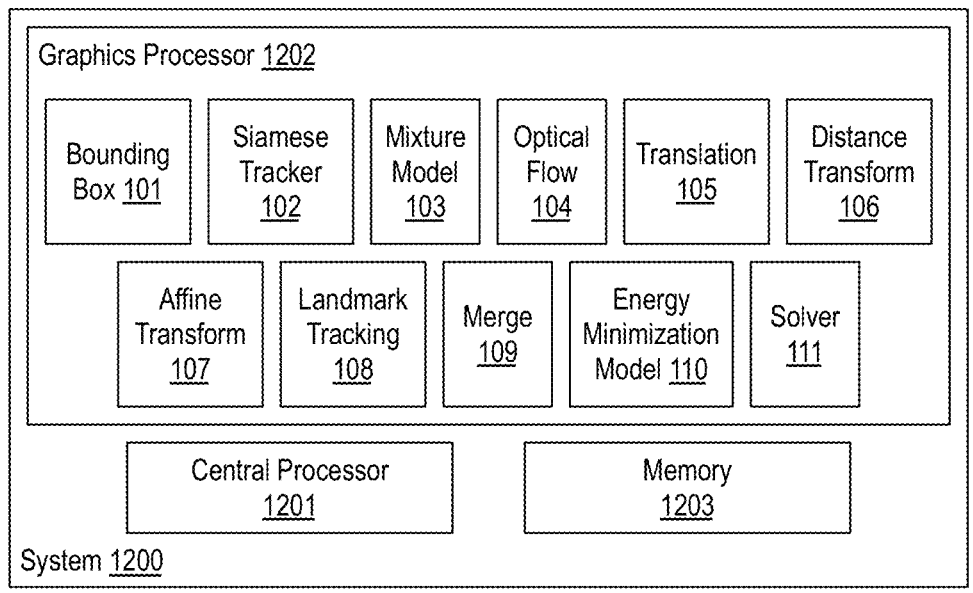
FIG. 12 is an illustrative diagram of an example system for providing segmentation in video.

FIG. 12 is an illustrative diagram of an example system 1200 for providing segmentation in video, arranged in accordance with at least some implementations of the present disclosure. As shown in FIG. 12, system 1200 includes one or more central processing units (CPU) 1201 (i.e., central processor(s)), a graphics processing unit 1202 (i.e., graphics processor), and memory stores 1203. Also as shown, graphics processing unit 1202 may include or implement bounding box module 101, Siamese tracker 102, color mixture model module 103, optical flow module 104, translation module 105, distance transform module 106, affine transform module 107, landmark tracking module 108, merge module 109, energy minimization model module 110, and solver 111. Such modules or components may be implemented to perform operations as discussed herein. In the example of system 1200, memory stores 1203 may store video frame data, bounding box data, segmentation data, color probability data, shape and motion probability data, merged probability data, energy model data, or any other data or data structure discussed herein.

As shown, in some examples, bounding box module 101, Siamese tracker 102, color mixture model module 103, optical flow module 104, translation module 105, distance transform module 106, affine transform module 107, landmark tracking module 108, merge module 109, energy minimization model module 110, and solver 111 are implemented via graphics processing unit 1202. In other examples, one or more or portions of bounding box module 101, Siamese tracker 102, color mixture model module 103, optical flow module 104, translation module 105, distance transform module 106, affine transform module 107, landmark tracking module 108, merge module 109, energy minimization model module 110, and solver 111 are implemented via central processing units 1201 or an image processing unit (not shown) of system 1200. In yet other examples, one or more or portions of bounding box module 101, Siamese tracker 102, color mixture model module 103, optical flow module 104, translation module 105, distance transform module 106, affine transform module 107, landmark tracking module 108, merge module 109, energy minimization model module 110, and solver 111 may be implemented via an imaging processing pipeline, graphics pipeline, or the like.

Graphics processing unit 1202 may include any number and type of graphics processing units that may provide the operations as discussed herein. Such operations may be implemented via software or hardware or a combination thereof. For example, graphics processing unit 1202 may include circuitry dedicated to manipulate data obtained from memory stores 1203. Central processing units 1201 may include any number and type of processing units or modules that may provide control and other high level functions for system 1200 and/or provide any operations as discussed herein. Memory stores 1203 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory stores 1203 may be implemented by cache memory. In an embodiment, one or more or portions of bounding box module 101, Siamese tracker 102, color mixture model module 103, optical flow module 104, translation module 105, distance transform module 106, affine transform module 107, landmark tracking module 108, merge module 109, energy minimization model module 110, and solver 111 are implemented via an execution unit (EU) of graphics processing unit 1202. The EU may include, for example, programmable logic or circuitry such as a logic core or cores that may provide a wide array of programmable logic functions. In an embodiment, one or more or portions of bounding box module 101, Siamese tracker 102, color mixture model module 103, optical flow module 104, translation module 105, distance transform module 106, affine transform module 107, landmark tracking module 108, merge module 109, energy minimization model module 110, and solver 111 are implemented via dedicated hardware such as fixed function circuitry or the like. Fixed function circuitry may include dedicated logic or circuitry and may provide a set of fixed function entry points that may map to the dedicated logic for a fixed purpose or function. In some embodiments, one or more or portions of bounding box module 101, Siamese tracker 102, color mixture model module 103, optical flow module 104, translation module 105, distance transform module 106, affine transform module 107, landmark tracking module 108, merge module 109, energy minimization model module 110, and solver 111 are implemented via an application specific integrated circuit (ASIC). The ASIC may include an integrated circuitry customized to perform the operations discussed herein.

Returning to discussion of FIG. 11, process 1100 begins at operation 1101, where a color mixture model is trained using a region within a first bounding box of a first video frame such that the first bounding box surrounding a ground truth segmentation of an object from a background within the bounding box. The object may be any object for which segmentation and tracking are desired. The ground truth segmentation may be generated based at least partially on manual operations such as pixel selection of pixels within the object. The bounding box may be generated such that the bounding box may have a predefined shape. In some embodiments, the bounding box surrounds the entirety of the ground truth segmentation and provides a padding to a perimeter of the bounding box.

Processing continues at operation 1102, where, based on an optical flow between at least the ground truth segmentation and a second bounding box of a second video frame, a first shape estimation of the object in the second video frame is determined. The second bounding box, which provides an attentive region in which the segmentation is expected in the second video frame may be generated using any suitable technique or techniques. In some embodiments, process 1100 further includes determining the second bounding box of the second video frame by applying a pretrained convolutional Siamese tracker network based on a search region of the second video frame and the first bounding box as an exemplar. Furthermore, the first shape estimation may include a binary shape estimation or a weak shape estimation generated using any suitable technique or techniques. In some embodiments, determining the first shape estimation includes translating the ground truth segmentation based on the optical flow and applying a distance transform to the translated ground truth segmentation. In some embodiments, the first shape estimation includes per-pixel probability scores indicative of a probability the pixel is part of the object.

Processing continues at operation 1103, where an affine transformation is applied to the first shape estimation to generate a second shape estimation of the object in the second video frame. In some embodiments, the affine transformation is generated based on object landmark tracking between the first and second video frames. For example, landmarks of any type, such as facial landmarks, may be tracked using a pretrained tracker and the tracked landmarks may be used to determine the affine transformation. The affine transformation may be represented by any suitable data structure such as an affine transformation matrix or the like. In some embodiments, the second shape estimation includes per-pixel probability scores indicative of a probability the pixel is part of the object.

Processing continues at operation 1104, where a final segmentation of the object in the second video frame is determined based at least on the second shape estimation and application of the color mixture model to the second bounding box. In some embodiments, the final segmentation provides a binary segmentation of the object in the second video frame. In some embodiments, the second shape estimations includes per-pixel shape and motion based probability scores indicative of a probability the pixel is part of the object. In some embodiments, application of the color mixture model generates a color based estimation of the segmentation of the object in the second video frame, such that the color based estimation includes per-pixel color based probability scores indicative of a probability the pixel is part of the object. In some embodiments, determining the final segmentation comprises merging the per-pixel shape and motion based probability scores and the per-pixel color based probability scores to generate final per-pixel probability scores. In some embodiments, merging the per-pixel shape and motion based probability scores and the per-pixel color based probability scores includes multiplying the per-pixel shape and motion based probability scores and the per-pixel color based probability scores to generate the final per-pixel probability scores.

In some embodiments, determining the final segmentation for the object includes minimizing a graph based energy summation model including a unary energy term based on the final per-pixel probability scores within the second bounding box, a pairwise energy term based on color differences between neighboring pixels within the second bounding box, and a super pixel energy term based on super pixel boundaries within the second bounding box. In some embodiments, minimizing the graph based energy summation model includes determining the final segmentation within the second boundary box that minimizes a sum of the unary energy term, the pairwise energy term, and the super pixel energy term. In some embodiments, the super pixel energy term provides, for a first candidate segmentation having all pixels of a super pixel within the object, a first super pixel energy value and, for a second candidate segmentation having at least one pixel of the super pixel outside the object and the remaining pixels within the object, a second super pixel energy value that is greater than the first super pixel energy value. In some embodiments, the super pixel energy term provides, for a first candidate segmentation having all pixels of a super pixel within the object, a first super pixel energy value and, for a second candidate segmentation having a percentage of pixels of a super pixel within the object that exceeds a threshold and at least one pixel of the super pixel outside the object, a second super pixel energy value that is greater than the first super pixel energy value. In some embodiments, the unary energy term provides for a greater unary energy value for a pixel in response to a candidate segmentation having a mismatch with respect to the final per-pixel probability score for the pixel. In some embodiments, the pairwise energy term provides for a greater pairwise energy value for a pair of pixels in response to the candidate segmentation having one of the pair of pixels within the object and the other outside the object and the pair of pixels having the same color. In some embodiments, minimizing the graph based energy summation includes applying a Boykov-Kolmogorov solver to the graph based energy summation. In some embodiments, the super pixel boundaries are generated by applying simple linear iterative clustering to the second bounding box.

As discussed herein, process 1100 is then be repeated (in pertinent parts) using the final segmentation for the second video frame (in place of the ground truth segmentation) to determine a final segmentation for a third video frame subsequent to the second video frame, which is used to determine a final segmentation for a fourth video frame, and so on. Process 1100 provides for segmentation of a current video frame based on a segmentation (optionally a ground truth segmentation) of a previous video frame. Process 1100 may be repeated any number of times either in series or in parallel for any number of video frames, video sequences, etc.

Various components of the systems described herein may be implemented in software, firmware, and/or hardware and/or any combination thereof. For example, various components of devices or systems discussed herein may be provided, at least in part, by hardware of a computing System-on-a-Chip (SoC) such as may be found in a computing system such as, for example, a computer, a laptop computer, a tablet, or a smart phone. For example, such components or modules may be implemented via a multi-core SoC processor. Those skilled in the art may recognize that systems described herein may include additional components that have not been depicted in the corresponding figures.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the discussed operations, modules, or components discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 13:
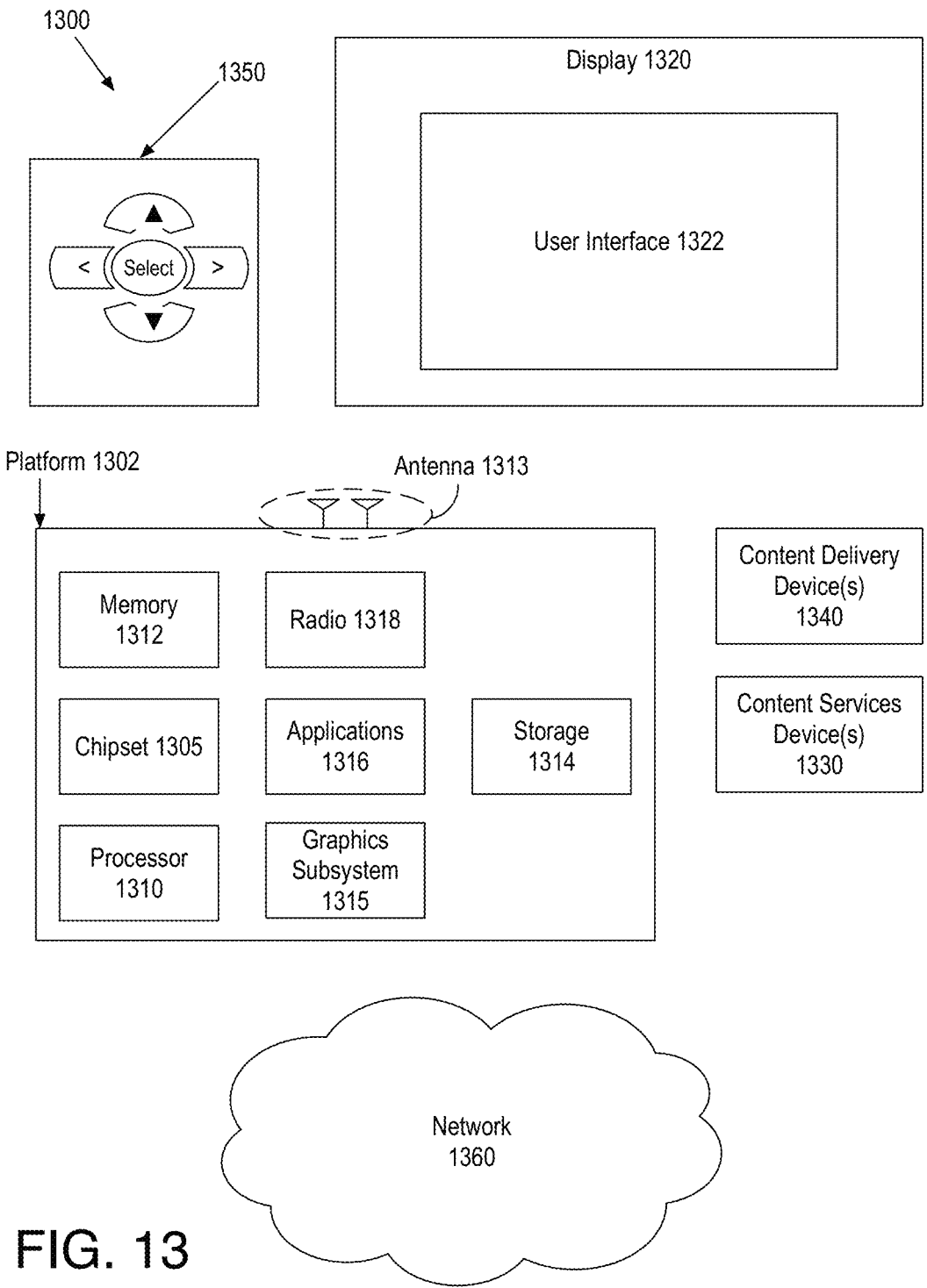
FIG. 13 is an illustrative diagram of an example system.

FIG. 13 is an illustrative diagram of an example system 1300, arranged in accordance with at least some implementations of the present disclosure. In various implementations, system 1300 may be a computing system although system 1300 is not limited to this context. For example, system 1300 may be incorporated into a personal computer (PC), laptop computer, ultra-laptop computer, tablet, phablet, touch pad, portable computer, handheld computer, palmtop computer, personal digital assistant (PDA), cellular telephone, combination cellular telephone/PDA, television, smart device (e.g., smart phone, smart tablet or smart television), mobile interne device (MID), messaging device, data communication device, peripheral device, gaming console, wearable device, display device, all-in-one device, two-in-one device, and so forth.

In various implementations, system 1300 includes a platform 1302 coupled to a display 1320. Platform 1302 may receive content from a content device such as content services device(s) 1330 or content delivery device(s) 1340 or other similar content sources such as a camera or camera module or the like. A navigation controller 1350 including one or more navigation features may be used to interact with, for example, platform 1302 and/or display 1320. Each of these components is described in greater detail below.

In various implementations, platform 1302 may include any combination of a chipset 1305, processor 1310, memory 1312, antenna 1313, storage 1314, graphics subsystem 1315, applications 1316 and/or radio 1318. Chipset 1305 may provide intercommunication among processor 1310, memory 1312, storage 1314, graphics subsystem 1315, applications 1316 and/or radio 1318. For example, chipset 1305 may include a storage adapter (not depicted) capable of providing intercommunication with storage 1314.

Processor 1310 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1310 may be dual-core processor(s), dual-core mobile processor(s), and so forth.

Memory 1312 may be implemented as a volatile memory device such as, but not limited to, a Random Access Memory (RAM), Dynamic Random Access Memory (DRAM), or Static RAM (SRAM).

Storage 1314 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1314 may include technology to increase the storage performance enhanced protection for valuable digital media when multiple hard drives are included, for example.

Graphics subsystem 1315 may perform processing of images such as still images, graphics, or video for display. Graphics subsystem 1315 may be a graphics processing unit (GPU), a visual processing unit (VPU), or an image processing unit, for example. In some examples, graphics subsystem 1315 may perform scanned image rendering as discussed herein. An analog or digital interface may be used to communicatively couple graphics subsystem 1315 and display 1320. For example, the interface may be any of a High-Definition Multimedia Interface, DisplayPort, wireless HDMI, and/or wireless HD compliant techniques. Graphics subsystem 1315 may be integrated into processor 1310 or chipset 1305. In some implementations, graphics subsystem 1315 may be a stand-alone device communicatively coupled to chipset 1305.

The image processing techniques described herein may be implemented in various hardware architectures. For example, image processing functionality may be integrated within a chipset. Alternatively, a discrete graphics and/or image processor and/or application specific integrated circuit may be used. As still another implementation, the image processing may be provided by a general purpose processor, including a multi-core processor. In further embodiments, the functions may be implemented in a consumer electronics device.

Radio 1318 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1318 may operate in accordance with one or more applicable standards in any version.

In various implementations, display 1320 may include any flat panel monitor or display. Display 1320 may include, for example, a computer display screen, touch screen display, video monitor, television-like device, and/or a television. Display 1320 may be digital and/or analog. In various implementations, display 1320 may be a holographic display. Also, display 1320 may be a transparent surface that may receive a visual projection. Such projections may convey various forms of information, images, and/or objects. For example, such projections may be a visual overlay for a mobile augmented reality (MAR) application. Under the control of one or more software applications 1316, platform 1302 may display user interface 1322 on display 1320.

In various implementations, content services device(s) 1330 may be hosted by any national, international and/or independent service and thus accessible to platform 1302 via the Internet, for example. Content services device(s) 1330 may be coupled to platform 1302 and/or to display 1320. Platform 1302 and/or content services device(s) 1330 may be coupled to a network 1360 to communicate (e.g., send and/or receive) media information to and from network 1360. Content delivery device(s) 1340 also may be coupled to platform 1302 and/or to display 1320.

In various implementations, content services device(s) 1330 may include a cable television box, personal computer, network, telephone, Internet enabled devices or appliance capable of delivering digital information and/or content, and any other similar device capable of uni-directionally or bi-directionally communicating content between content providers and platform 1302 and/display 1320, via network 1360 or directly. It will be appreciated that the content may be communicated uni-directionally and/or bi-directionally to and from any one of the components in system 1300 and a content provider via network 1360. Examples of content may include any media information including, for example, video, music, medical and gaming information, and so forth.

Content services device(s) 1330 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1302 may receive control signals from navigation controller 1350 having one or more navigation features. The navigation features of navigation controller 1350 may be used to interact with user interface 1322, for example. In various embodiments, navigation controller 1350 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 1350 may be replicated on a display (e.g., display 1320) by movements of a pointer, cursor, focus ring, or other visual indicators displayed on the display. For example, under the control of software applications 1316, the navigation features located on navigation controller 1350 may be mapped to virtual navigation features displayed on user interface 1322, for example. In various embodiments, navigation controller 1350 may not be a separate component but may be integrated into platform 1302 and/or display 1320. The present disclosure, however, is not limited to the elements or in the context shown or described herein.

In various implementations, drivers (not shown) may include technology to enable users to instantly turn on and off platform 1302 like a television with the touch of a button after initial boot-up, when enabled, for example. Program logic may allow platform 1302 to stream content to media adaptors or other content services device(s) 1330 or content delivery device(s) 1340 even when the platform is turned "off." In addition, chipset 1305 may include hardware and/or software support for 5.1 surround sound audio and/or high definition 13.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 1300 may be integrated. For example, platform 1302 and content services device(s) 1330 may be integrated, or platform 1302 and content delivery device(s) 1340 may be integrated, or platform 1302, content services device(s) 1330, and content delivery device(s) 1340 may be integrated, for example. In various embodiments, platform 1302 and display 1320 may be an integrated unit. Display 1320 and content service device(s) 1330 may be integrated, or display 1320 and content delivery device(s) 1340 may be integrated, for example. These examples are not meant to limit the present disclosure.

In various embodiments, system 1300 may be implemented as a wireless system, a wired system, or a combination of both. When implemented as a wireless system, system 1300 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1300 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1302 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 13.

Figure 14:
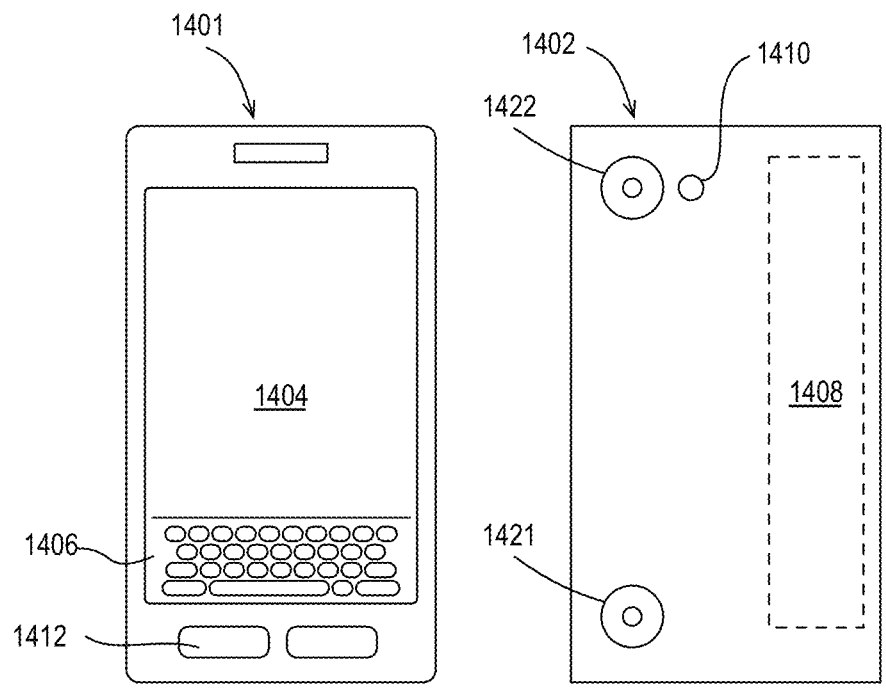
FIG. 14 illustrates an example device, all arranged in accordance with at least some implementations of the present disclosure.

As described above, system 1300 may be embodied in varying physical styles or form factors. FIG. 14 illustrates an example small form factor device 1400, arranged in accordance with at least some implementations of the present disclosure. In some examples, system 1300 may be implemented via device 1400. In other examples, other systems, components, or modules discussed herein or portions thereof may be implemented via device 1400. In various embodiments, for example, device 1400 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smartphone, smart tablet or smart mobile television), mobile internet device (MID), messaging device, data communication device, cameras (e.g. point-and-shoot cameras, super-zoom cameras, digital single-lens reflex (DSLR) cameras), and so forth.

Examples of a mobile computing device also may include computers that are arranged to be implemented by a motor vehicle or robot, or worn by a person, such as wrist computers, finger computers, ring computers, eyeglass computers, belt-clip computers, arm-band computers, shoe computers, clothing computers, and other wearable computers. In various embodiments, for example, a mobile computing device may be implemented as a smartphone capable of executing computer applications, as well as voice communications and/or data communications. Although some embodiments may be described with a mobile computing device implemented as a smartphone by way of example, it may be appreciated that other embodiments may be implemented using other wireless mobile computing devices as well. The embodiments are not limited in this context.

As shown in FIG. 14, device 1400 may include a housing with a front 1401 and a back 1402. Device 1400 includes a display 1404, an input/output (I/O) device 1406, a color camera 1421, a color camera 1422, and an integrated antenna 1408. For example, color camera 1421 and color camera 1422 and may input image data (e.g., left and right images) as discussed herein. Device 1400 also may include navigation features 1412. I/O device 1406 may include any suitable I/O device for entering information into a mobile computing device. Examples for I/O device 1406 may include an alphanumeric keyboard, a numeric keypad, a touch pad, input keys, buttons, switches, microphones, speakers, voice recognition device and software, and so forth. Information also may be entered into device 1400 by way of microphone (not shown), or may be digitized by a voice recognition device. As shown, device 1400 may include color cameras 1421, 1422, and a flash 1410 integrated into back 1402 (or elsewhere) of device 1400. In other examples, color cameras 1421, 1422, and flash 1410 may be integrated into front 1401 of device 1400 or both front and back sets of cameras may be provided. Color cameras 1421, 1422 and a flash 1410 may be components of a camera module to originate color image data that may be processed into an image or streaming video that is output to display 1404 and/or communicated remotely from device 1400 via antenna 1408 for example.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

In one or more first embodiments, a method for providing segmentation in video comprises training a color mixture model using a region within a first bounding box of a first video frame, the first bounding box surrounding a ground truth segmentation of an object from a background within the bounding box, determining, based on an optical flow between at least the ground truth segmentation and a second bounding box of a second video frame, a first shape estimation of the object in the second video frame, applying an affine transformation to the first shape estimation to generate a second shape estimation of the object in the second video frame, the affine transformation generated based on object landmark tracking between the first and second video frames, and determining a final segmentation of the object in the second video frame based at least on the second shape estimation and application of the color mixture model to the second bounding box.

In one or more second embodiments, further to the first embodiment, the second shape estimations comprises per-pixel shape and motion based probability scores indicative of a probability the pixel is part of the object, wherein application of the color mixture model generates a color based estimation of the segmentation of the object in the second video frame, the color based estimation comprising per-pixel color based probability scores indicative of a probability the pixel is part of the object, and wherein determining the final segmentation comprises merging the per-pixel shape and motion based probability scores and the per-pixel color based probability scores to generate final per-pixel probability scores.

In one or more third embodiments, further to the first or second embodiments, merging the per-pixel shape and motion based probability scores and the per-pixel color based probability scores comprises multiplying the per-pixel shape and motion based probability scores and the per-pixel color based probability scores to generate the final per-pixel probability scores.

In one or more fourth embodiments, further to any of the first through third embodiments, determining the final segmentation for the object comprises minimizing a graph based energy summation model comprising a unary energy term based on the final per-pixel probability scores within the second bounding box, a pairwise energy term based on color differences between neighboring pixels within the second bounding box, and a super pixel energy term based on super pixel boundaries within the second bounding box.

In one or more fifth embodiments, further to any of the first through fourth embodiments, minimizing the graph based energy summation model comprises determining the final segmentation within the second boundary box that minimizes a sum of the unary energy term, the pairwise energy term, and the super pixel energy term.

In one or more sixth embodiments, further to any of the first through fifth embodiments, the super pixel energy term provides, for a first candidate segmentation having all pixels of a super pixel within the object, a first super pixel energy value and, for a second candidate segmentation having at least one pixel of the super pixel outside the object and the remaining pixels within the object, a second super pixel energy value that is greater than the first super pixel energy value.

In one or more seventh embodiments, further to any of the first through sixth embodiments, the super pixel energy term provides, for a first candidate segmentation having all pixels of a super pixel within the object, a first super pixel energy value and, for a second candidate segmentation having a percentage of pixels of a super pixel within the object that exceeds a threshold and at least one pixel of the super pixel outside the object, a second super pixel energy value that is greater than the first super pixel energy value.

In one or more eighth embodiments, further to any of the first through seventh embodiments, the unary energy term provides for a greater unary energy value for a pixel in response to a candidate segmentation having a mismatch with respect to the final per-pixel probability score for the pixel and the pairwise energy term provides for a greater pairwise energy value for a pair of pixels in response to the candidate segmentation having one of the pair of pixels within the object and the other outside the object and the pair of pixels having the same color.

In one or more ninth embodiments, further to any of the first through eighth embodiments, minimizing the graph based energy summation comprises applying a Boykov-Kolmogorov solver to the graph based energy summation and wherein the super pixel boundaries are generated by applying simple linear iterative clustering to the second bounding box.

In one or more tenth embodiments, further to any of the first through ninth embodiments, determining the first shape estimation comprises translating the ground truth segmentation based on the optical flow and applying a distance transform to the translated ground truth segmentation, wherein the first and second shape estimations comprises per-pixel probability scores indicative of a probability the pixel is part of the object.

In one or more eleventh embodiments, further to any of the first through more embodiments, the method further comprises determining the second bounding box of the second video frame by applying a pretrained convolutional Siamese tracker network based on a search region of the second video frame and the first bounding box as an exemplar.

In one or more twelfth embodiments, a device or system includes a memory and a processor to perform a method according to any one of the above embodiments.

In one or more thirteenth embodiments, at least one machine readable medium includes a plurality of instructions that in response to being executed on a computing device, cause the computing device to perform a method according to any one of the above embodiments.

In one or more fourteenth embodiments, an apparatus includes means for performing a method according to any one of the above embodiments.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A system for providing segmentation in video comprising:
a memory to store a first video frame; and
one or more processors coupled to the memory, the one or more processors to:
train a color mixture model using a region within a first bounding box of the first video frame, the first bounding box surrounding a ground truth segmentation of an object from a background within the bounding box;
determine, based on an optical flow between at least the ground truth segmentation and a second bounding box of a second video frame, a first shape estimation of the object in the second video frame;
apply an affine transformation to the first shape estimation to generate a second shape estimation of the object in the second video frame, the affine transformation generated based on object landmark tracking between the first and second video frames; and
determine a final segmentation of the object in the second video frame based at least on the second shape estimation and application of the color mixture model to the second bounding box.

2. The system of claim 1, wherein the second shape estimation comprises per-pixel shape and motion based probability scores indicative of a probability the pixel is part of the object, wherein application of the color mixture model generates a color based estimation of a segmentation of the object in the second video frame, the color based estimation comprising per-pixel color based probability scores indicative of a probability the pixel is part of the object, and wherein the one or more processors to determine the final segmentation comprises the one or more processors to merge the per-pixel shape and motion based probability scores and the per-pixel color based probability scores to generate final per-pixel probability scores.

3. The system of claim 2, wherein the one or more processors to merge the per-pixel shape and motion based probability scores and the per-pixel color based probability scores comprises the one or more processors to multiply the per-pixel shape and motion based probability scores and the per-pixel color based probability scores to generate the final per-pixel probability scores.

4. The system of claim 2, wherein the one or more processors to determine the final segmentation for the object comprises the one or more processors to minimize a graph based energy summation model comprising a unary energy term based on the final per-pixel probability scores within the second bounding box, a pairwise energy term based on color differences between neighboring pixels within the second bounding box, and a super pixel energy term based on super pixel boundaries within the second bounding box.

5. The system of claim 4, wherein the one or more processors to minimize the graph based energy summation model comprises the one or more processors to determine the final segmentation within the second bounding box that minimizes a sum of the unary energy term, the pairwise energy term, and the super pixel energy term.

6. The system of claim 4, wherein the super pixel energy term provides, for a first candidate segmentation having all pixels of a super pixel within the object, a first super pixel energy value and, for a second candidate segmentation having at least one pixel of the super pixel outside the object and the remaining pixels within the object, a second super pixel energy value that is greater than the first super pixel energy value.

7. The system of claim 4, wherein the super pixel energy term provides, for a first candidate segmentation having all pixels of a super pixel within the object, a first super pixel energy value and, for a second candidate segmentation having a percentage of pixels of a super pixel within the object that exceeds a threshold and at least one pixel of the super pixel outside the object, a second super pixel energy value that is greater than the first super pixel energy value.

8. The system of claim 4, wherein the unary energy term provides for a greater unary energy value for a pixel in response to a candidate segmentation having a mismatch with respect to the final per-pixel probability scores for the pixel and the pairwise energy term provides for a greater pairwise energy value for a pair of pixels in response to the candidate segmentation having one of the pair of pixels within the object and the other outside the object and the pair of pixels having the same color.

9. The system of claim 4, wherein the one or more processors to minimize the graph based energy summation comprises the one or more processors to apply a Boykov-Kolmogorov solver to the graph based energy summation and wherein the super pixel boundaries are generated by applying simple linear iterative clustering to the second bounding box.

10. The system of claim 1, wherein the one or more processors to determine the first shape estimation comprises the one or more processors to translate the ground truth segmentation based on the optical flow and to apply a distance transform to the translated ground truth segmentation, wherein the first and second shape estimations comprises per-pixel probability scores indicative of a probability the pixel is part of the object.

11. The system of claim 1, the one or more processors to: determine the second bounding box of the second video frame by applying a pretrained convolutional Siamese tracker network based on a search region of the second video frame and the first bounding box as an exemplar.

12. A method for providing segmentation in video comprising:
training a color mixture model using a region within a first bounding box of a first video frame, the first bounding box surrounding a ground truth segmentation of an object from a background within the bounding box;
determining, based on an optical flow between at least the ground truth segmentation and a second bounding box of a second video frame, a first shape estimation of the object in the second video frame;
applying an affine transformation to the first shape estimation to generate a second shape estimation of the object in the second video frame, the affine transformation generated based on object landmark tracking between the first and second video frames; and
determining a final segmentation of the object in the second video frame based at least on the second shape estimation and application of the color mixture model to the second bounding box.

13. The method of claim 12, wherein the second shape estimation comprises per-pixel shape and motion based probability scores indicative of a probability the pixel is part of the object, wherein application of the color mixture model generates a color based estimation of a segmentation of the object in the second video frame, the color based estimation comprising per-pixel color based probability scores indicative of a probability the pixel is part of the object, and wherein determining the final segmentation comprises merging the per-pixel shape and motion based probability scores and the per-pixel color based probability scores to generate final per-pixel probability scores.

14. The method of claim 13, wherein determining the final segmentation for the object comprises minimizing a graph based energy summation model comprising a unary energy term based on the final per-pixel probability scores within the second bounding box, a pairwise energy term based on color differences between neighboring pixels within the second bounding box, and a super pixel energy term based on super pixel boundaries within the second bounding box.

15. The method of claim 14, wherein the super pixel energy term provides, for a first candidate segmentation having all pixels of a super pixel within the object, a first super pixel energy value and, for a second candidate segmentation having at least one pixel of the super pixel outside the object and the remaining pixels within the object, a second super pixel energy value that is greater than the first super pixel energy value.

16. The method of claim 14, wherein the unary energy term provides for a greater unary energy value for a pixel in response to a candidate segmentation having a mismatch with respect to the final per-pixel probability scores for the pixel and the pairwise energy term provides for a greater pairwise energy value for a pair of pixels in response to the candidate segmentation having one of the pair of pixels within the object and the other outside the object and the pair of pixels having the same color.

17. The method of claim 12, further comprising:
determining the second bounding box of the second video frame by applying a pretrained convolutional Siamese tracker network based on a search region of the second video frame and the first bounding box as an exemplar.

18. At least one non-transitory machine readable medium comprising a plurality of instructions that, in response to being executed on a computing device, cause the computing device to provide segmentation in video by:
training a color mixture model using a region within a first bounding box of a first video frame, the first bounding box surrounding a ground truth segmentation of an object from a background within the bounding box;
determining, based on an optical flow between at least the ground truth segmentation and a second bounding box of a second video frame, a first shape estimation of the object in the second video frame;
applying an affine transformation to the first shape estimation to generate a second shape estimation of the object in the second video frame, the affine transformation generated based on object landmark tracking between the first and second video frames; and
determining a final segmentation of the object in the second video frame based at least on the second shape estimation and application of the color mixture model to the second bounding box.

19. The non-transitory machine readable medium of claim 18, wherein the second shape estimation comprises per-pixel shape and motion based probability scores indicative of a probability the pixel is part of the object, wherein application of the color mixture model generates a color based estimation of a segmentation of the object in the second video frame, the color based estimation comprising per-pixel color based probability scores indicative of a probability the pixel is part of the object, and wherein determining the final segmentation comprises merging the per-pixel shape and motion based probability scores and the per-pixel color based probability scores to generate final per-pixel probability scores.

20. The non-transitory machine readable medium of claim 19, wherein determining the final segmentation for the object comprises minimizing a graph based energy summation model comprising a unary energy term based on the final per-pixel probability scores within the second bounding box, a pairwise energy term based on color differences between neighboring pixels within the second bounding box, and a super pixel energy term based on super pixel boundaries within the second bounding box.

21. The non-transitory machine readable medium of claim 20, wherein the super pixel energy term provides, for a first candidate segmentation having all pixels of a super pixel within the object, a first super pixel energy value and, for a second candidate segmentation having at least one pixel of the super pixel outside the object and the remaining pixels within the object, a second super pixel energy value that is greater than the first super pixel energy value.

22. The non-transitory machine readable medium of claim 20, wherein the unary energy term provides for a greater unary energy value for a pixel in response to a candidate segmentation having a mismatch with respect to the final per-pixel probability score for the pixel and the pairwise energy term provides for a greater pairwise energy value for a pair of pixels in response to the candidate segmentation having one of the pair of pixels within the object and the other outside the object and the pair of pixels having the same color.

* * * * *